US012658995B2

(12) United States Patent
Hindy et al.

(10) Patent No.: US 12,658,995 B2
(45) Date of Patent: Jun. 16, 2026

(54) CHANNEL STATE INFORMATION REPORTING

(71) Applicant: Lenovo (Singapore) Pte. Ltd., New Tech Park (SG)

(72) Inventors: Ahmed Monier Ibrahim Saleh Hindy, Aurora, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 333 days.

(21) Appl. No.: 18/256,302

(22) PCT Filed: Nov. 17, 2021

(86) PCT No.: PCT/IB2021/060632
§ 371 (c)(1),
(2) Date: Jun. 7, 2023

(87) PCT Pub. No.: WO2022/123365
PCT Pub. Date: Jun. 16, 2022

(65) Prior Publication Data
US 2024/0056149 A1     Feb. 15, 2024

Related U.S. Application Data

(60) Provisional application No. 63/122,317, filed on Dec. 7, 2020.

(51) Int. Cl.
*H04B 7/06*       (2006.01)
*H04L 5/00*       (2006.01)
*H04W 24/10*      (2009.01)

(52) U.S. Cl.
CPC ......... *H04B 7/0626* (2013.01); *H04L 5/0053* (2013.01); *H04W 24/10* (2013.01)

(58) Field of Classification Search
CPC ... H04B 7/0626; H04L 5/0053; H04L 5/0035; H04L 5/0057; H04L 5/0048; H04W 24/10
See application file for complete search history.

(56) References Cited

U.S. PATENT DOCUMENTS

| 12,003,994 B2 * | 6/2024 | Chandrasekhar ..... H04L 5/0057 |
| 2017/0164226 A1 * | 6/2017 | Wei ....................... H04L 5/0057 |

(Continued)

FOREIGN PATENT DOCUMENTS

| EP | 3451736 A1 | 3/2019 | |
| WO | WO-2020051896 A1 * | 3/2020 | ........... H04B 7/0691 |
| WO | 2020215105 A2 | 10/2020 | |

OTHER PUBLICATIONS

PCT/IB2021/060632, "Notification of Transmittal of the International Search Report and the Written Opinion of the International Searching Authority, or the Declaration", International Searching Authority, Feb. 18, 2022, pp. 1-13.

(Continued)

*Primary Examiner* — Brandon J Miller

(74) *Attorney, Agent, or Firm* — Kunzler Needham & Hilton; Bruce R. Needham

(57) ABSTRACT

Apparatuses, methods, and systems are disclosed for channel state information ("CSI") reporting. One method includes receiving at least one CSI report setting. Each CSI report setting of the at least one CSI report setting triggers at least one CSI resource setting. The method includes receiving at least one set of reference signals transmitted from at least one transmission and reception point ("TRP") in a network according to the at least one CSI resource setting. The method includes receiving an indication of CSI measurement, and/or CSI reporting corresponding to a single frequency network ("SFN") scheme for the at least one TRP in the network. The method includes transmitting at least one CSI report on at least one physical uplink shared (Continued)

channel (PUSCH), and/or physical uplink control channel (PUCCH) based on the at least one CSI report setting.

20 Claims, 9 Drawing Sheets

(56)                    References Cited

U.S. PATENT DOCUMENTS

| | | | | |
|---|---|---|---|---|
| 2018/0279374 | A1* | 9/2018 | Sun | H04L 5/0094 |
| 2019/0141677 | A1* | 5/2019 | Harrison | H04W 72/04 |
| 2020/0292715 | A1* | 9/2020 | Farnham | G01S 13/003 |
| 2020/0373985 | A1* | 11/2020 | Tsai | H04W 24/10 |
| 2021/0136802 | A1* | 5/2021 | Cirik | H04W 72/231 |

OTHER PUBLICATIONS

Samsung et al., "WF on Type I and II CSI codebooks", 3GPP TSG-RAN WG1 #89 R1-1709232, May 15-19, 2017, pp. 1-24.

Huawei et al., "CSI measurement enhancement for multi-TRP/panel transmission", 3GPP TSG RAN WG1 Meeting #97 R1-1906038, May 13-17, 2019, pp. 1-4.
LG Electronics, "Discussion on CSI enhancement for NCJT", 3GPP TSG RAN WG1 #97 R1-1906736, May 13-17, 2019, pp. 1-3.
Ericsson, "Views on CSI framework for multi-TRP", 3GPP TSG RAN WG1 Meeting #97 R1-1907424, May 13-17, 2019, pp. 1-2.
Spreadtrum Communications, "Discussion on CSI enhancement for multiple TRP/Panel transmission", 3GPP TSG RAN WG1 #98 R1-1908961, Aug. 26-30, 2019, pp. 1-4.
3GPP, "3rd Generation Partnership Project; Technical Specification Group Radio Access Network; NR; Multiplexing and channel coding (Release 16)", 3GPP TS 38.212 V16.3.0, Sep. 2020, pp. 1-152.
3GPP, "3rd Generation Partnership Project; Technical Specification Group Radio Access Network; NR; Physical layer procedures for data (Release 16)", 3GPP TS 38.214 V16.3.0, Sep. 2020, pp. 1-166.
3GPP, "3rd Generation Partnership Project; Technical Specification Group Radio Access Network; NR; Radio Resource Control (RRC) protocol specification (Release 16)", 3GPP TS 38.331 V16.2.0, Sep. 2020, pp. 1-921.

* cited by examiner

100

300

400

```
-- ASN1START
-- TAG-CSI-REPORTCONFIG-START

CSI-ReportConfig ::=                    SEQUENCE {
    reportConfigId                      CSI-ReportConfigId,
    carrier                             ServCellIndex              OPTIONAL,   -- Need S
    resourcesForChannelMeasurement      CSI-ResourceConfigId,
    csi-IM-ResourcesForInterference     CSI-ResourceConfigId       OPTIONAL,   -- Need R
    nzp-CSI-RS-ResourcesForInterference CSI-ResourceConfigId       OPTIONAL,   -- Need R reportConfigType                    CHOICE {
        periodic                        SEQUENCE {
            reportSlotConfig            CSI-ReportPeriodicityAndOffset,
            pucch-CSI-ResourceList      SEQUENCE (SIZE (1..maxNrofBWPs)) OF PUCCH-CSI-Resource
        },
        semiPersistentOnPUCCH           SEQUENCE {
            reportSlotConfig            CSI-ReportPeriodicityAndOffset,
            pucch-CSI-ResourceList      SEQUENCE (SIZE (1..maxNrofBWPs)) OF PUCCH-CSI-Resource
        },
        semiPersistentOnPUSCH           SEQUENCE {
            reportSlotConfig            ENUMERATED {sl5, sl10, sl20, sl40, sl80, sl160, sl320},
            reportSlotOffsetList        SEQUENCE (SIZE (1..maxNrofUL-Allocations)) OF INTEGER(0..32),
            p0alpha                         P0-PUSCH-AlphaSetId
        },
        aperiodic                       SEQUENCE {
            reportSlotOffsetList        SEQUENCE (SIZE (1..maxNrofUL-Allocations)) OF INTEGER(0..32)
        }
    },
    highSpeed-CSI-Enabled               ENUMERATED {TRUE}        OPTIONAL,   -- Need R

[[..................]]

-- TAG-CSI-REPORTCONFIG-STOP
-- ASN1STOP
```

```
-- ASN1START
-- TAG-CSI-REPORTCONFIG-START

CSI-ReportConfig ::=                    SEQUENCE {
    reportConfigId                      CSI-ReportConfigId,
    carrier                             ServCellIndex          OPTIONAL,   -- Need S
    resourcesForChannelMeasurement      CSI-ResourceConfigId,
    csi-IM-ResourcesForInterference     CSI-ResourceConfigId   OPTIONAL,   -- Need R
    nzp-CSI-RS-ResourcesForInterference CSI-ResourceConfigId   OPTIONAL,   -- Need R
    resourcesForChannelMeasurement      CSI-ResourceConfigId   OPTIONAL    -- Need R reportConfigType                    CHOICE {
        periodic                            SEQUENCE {
            reportSlotConfig                CSI-ReportPeriodicityAndOffset,
            pucch-CSI-ResourceList          SEQUENCE (SIZE (1..maxNrofBWPs)) OF PUCCH-CSI-Resource
        },
        semiPersistentOnPUCCH               SEQUENCE {
            reportSlotConfig                CSI-ReportPeriodicityAndOffset,
            pucch-CSI-ResourceList          SEQUENCE (SIZE (1..maxNrofBWPs)) OF PUCCH-CSI-Resource
        },
        semiPersistentOnPUSCH               SEQUENCE {
            reportSlotConfig                ENUMERATED {sl5, sl10, sl20, sl40, sl80, sl160, sl320},
            reportSlotOffsetList            SEQUENCE (SIZE (1..maxNrofUL-Allocations)) OF INTEGER(0..32),
            p0alpha                             P0-PUSCH-AlphaSetId
        },
        aperiodic                           SEQUENCE {
            reportSlotOffsetList            SEQUENCE (SIZE (1..maxNrofUL-Allocations)) OF INTEGER(0..32)
        }
    },

[...........................]

-- TAG-CSI-REPORTCONFIG-STOP
-- ASN1STOP
```

FIG. 5

```
-- ASN1START
-- TAG-CSI-REPORTCONFIG-START

CSI-ReportConfig ::=                    SEQUENCE {
    reportConfigId                          CSI-ReportConfigId,
    carrier                                 ServCellIndex           OPTIONAL,   -- Need S
    resourcesForChannelMeasurement          CSI-ResourceConfigId,
    csi-IM-ResourcesForInterference         CSI-ResourceConfigId    OPTIONAL,   -- Need R
    nzp-CSI-RS-ResourcesForInterference     CSI-ResourceConfigId    OPTIONAL,   -- Need R

[...................]

timeRestrictionForChannelMeasurements   ENUMERATED {configured, notConfigured},
    timeRestrictionForInterferenceMeasurements ENUMERATED {configured, notConfigured},
    codebookConfig                          CodebookConfig              OPTIONAL,   -- Need R
    codebookConfig2                         CodebookConfig              OPTIONAL,   -- Need R
    dummy                                   ENUMERATED {n1, n2}         OPTIONAL,   -- Need R

[...................]

reportQuantity-r16                      CHOICE {
        cri-SINR-r16                            NULL,
        ssb-Index-SINR-r16                      NULL
    }                                                                   OPTIONAL,   -- Need R
    codebookConfig-r16                      CodebookConfig-r16          OPTIONAL    -- Need R
    codebookConfig2-r17                     CodebookConfig-r17          OPTIONAL    -- Need R
    }}
}

[...................]

-- TAG-CSI-REPORTCONFIG-STOP
-- ASN1STOP
```

```
-- ASN1START
-- TAG-CSI-REPORTCONFIG-START

CSI-ReportConfig ::=                    SEQUENCE {
    reportConfigId                      CSI-ReportConfigId,
    carrier                             ServCellIndex              OPTIONAL,   -- Need S
    resourcesForChannelMeasurement      CSI-ResourceConfigId,
    csi-IM-ResourcesForInterference     CSI-ResourceConfigId       OPTIONAL,   -- Need R
    nzp-CSI-RS-ResourcesForInterference CSI-ResourceConfigId       OPTIONAL,   -- Need R reportConfigType                    CHOICE {
        periodic                        SEQUENCE {
            reportSlotConfig            CSI-ReportPeriodicityAndOffset,
            pucch-CSI-ResourceList      SEQUENCE (SIZE (1..maxNrofBWPs)) OF PUCCH-CSI-Resource
        },
        semiPersistentOnPUCCH           SEQUENCE {
            reportSlotConfig            CSI-ReportPeriodicityAndOffset,
            pucch-CSI-ResourceList      SEQUENCE (SIZE (1..maxNrofBWPs)) OF PUCCH-CSI-Resource
        },
        semiPersistentOnPUSCH           SEQUENCE {
            reportSlotConfig            ENUMERATED {sl5, sl10, sl20, sl40, sl60, sl160, sl320},
            reportSlotOffsetList        SEQUENCE (SIZE (1.. maxNrofUL-Allocations)) OF INTEGER(0..32),
            p0alpha                         P0-PUSCH-AlphaSetId
        },
        aperiodic                       SEQUENCE {
            reportSlotOffsetList        SEQUENCE (SIZE (1..maxNrofUL-Allocations)) OF INTEGER(0..32)
        }
    },
    nPMI                                ENUMERATED {1,2}           OPTIONAL,   -- Need R

[...................]

-- TAG-CSI-REPORTCONFIG-STOP
-- ASN1STOP
```

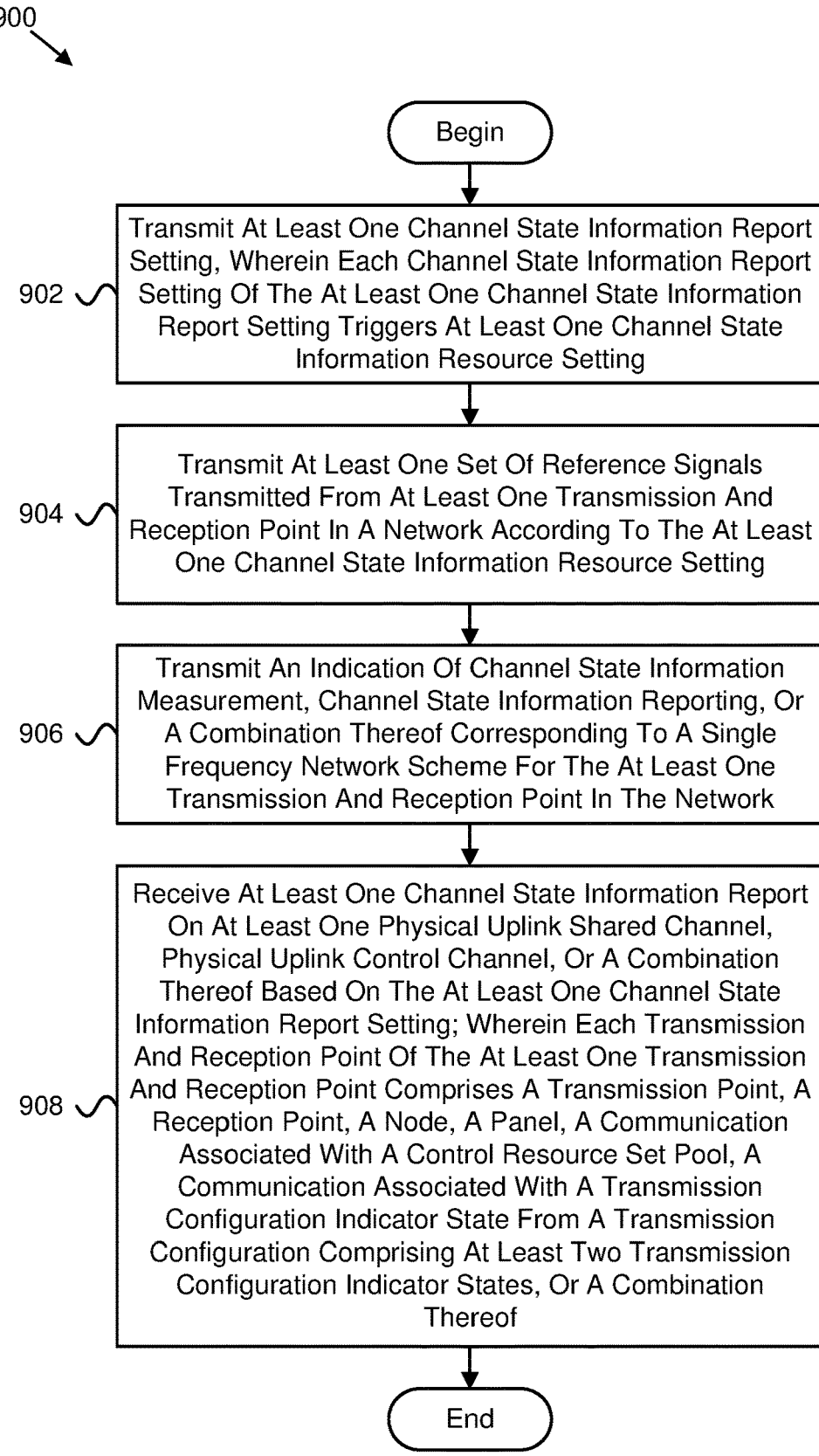

Begin

902 — Transmit At Least One Channel State Information Report Setting, Wherein Each Channel State Information Report Setting Of The At Least One Channel State Information Report Setting Triggers At Least One Channel State Information Resource Setting 904 — Transmit At Least One Set Of Reference Signals Transmitted From At Least One Transmission And Reception Point In A Network According To The At Least One Channel State Information Resource Setting 906 — Transmit An Indication Of Channel State Information Measurement, Channel State Information Reporting, Or A Combination Thereof Corresponding To A Single Frequency Network Scheme For The At Least One Transmission And Reception Point In The Network 908 — Receive At Least One Channel State Information Report On At Least One Physical Uplink Shared Channel, Physical Uplink Control Channel, Or A Combination Thereof Based On The At Least One Channel State Information Report Setting; Wherein Each Transmission And Reception Point Of The At Least One Transmission And Reception Point Comprises A Transmission Point, A Reception Point, A Node, A Panel, A Communication Associated With A Control Resource Set Pool, A Communication Associated With A Transmission Configuration Indicator State From A Transmission Configuration Comprising At Least Two Transmission Configuration Indicator States, Or A Combination Thereof End

FIG. 9

CHANNEL STATE INFORMATION REPORTING

CROSS-REFERENCE TO RELATED APPLICATIONS

This application claims priority to U.S. Patent Application Ser. No. 63/122,317 entitled "APPARATUSES, METH-ODS, AND SYSTEMS FOR CSI ENHANCEMENTS FOR HIGH-SPEED TRAIN SCENARIO" and filed on Dec. 7, 2020 for Ahmed Monier Ibrahim Saleh Hindy, which is incorporated herein by reference in its entirety.

FIELD

The subject matter disclosed herein relates generally to wireless communications and more particularly relates to channel state information reporting.

BACKGROUND

In certain wireless communications networks, multiple transmission and reception points may be used. The transmission and reception points may communicate with the same user equipment concurrently.

BRIEF SUMMARY

Methods for channel state information reporting are disclosed. Apparatuses and systems also perform the functions of the methods. One embodiment of a method includes receiving, at a user equipment, at least one channel state information report setting. Each channel state information report setting of the at least one channel state information report setting triggers at least one channel state information resource setting. In some embodiments, the method includes receiving at least one set of reference signals transmitted from at least one transmission and reception point in a network according to the at least one channel state information resource setting. In certain embodiments, the method includes receiving an indication of channel state information measurement, channel state information reporting, or a combination thereof corresponding to a single frequency network scheme for the at least one transmission and reception point in the network. In various embodiments, the method includes transmitting at least one channel state information report on at least one physical uplink shared channel, physical uplink control channel, or a combination thereof based on the at least one channel state information report setting. Each transmission and reception point of the at least one transmission and reception point includes a transmission point, a reception point, a node, a panel, a communication associated with a control resource set pool, a communication associated with a transmission configuration indicator state from a transmission configuration having at least two transmission configuration indicator states, or a combination thereof.

One apparatus for channel state information reporting includes a user equipment. In some embodiments, the apparatus includes a receiver that: receives at least one channel state information report setting, wherein each channel state information report setting of the at least one channel state information report setting triggers at least one channel state information resource setting; receives at least one set of reference signals transmitted from at least one transmission and reception point in a network according to the at least one channel state information resource setting; and receives an indication of channel state information measurement, channel state information reporting, or a combination thereof corresponding to a single frequency network scheme for the at least one transmission and reception point in the network. In various embodiments, the apparatus includes a transmitter that transmits at least one channel state information report on at least one physical uplink shared channel, physical uplink control channel, or a combination thereof based on the at least one channel state information report setting. Each transmission and reception point of the at least one transmission and reception point includes a transmission point, a reception point, a node, a panel, a communication associated with a control resource set pool, a communication associated with a transmission configuration indicator state from a transmission configuration having at least two transmission configuration indicator states, or a combination thereof.

Another embodiment of a method for channel state information reporting includes transmitting, from a network device, at least one channel state information report setting. Each channel state information report setting of the at least one channel state information report setting triggers at least one channel state information resource setting. In some embodiments, the method includes transmitting at least one set of reference signals transmitted from at least one transmission and reception point in a network according to the at least one channel state information resource setting. In certain embodiments, the method includes transmitting an indication of channel state information measurement, channel state information reporting, or a combination thereof corresponding to a single frequency network scheme for the at least one transmission and reception point in the network. In various embodiments, the method includes receiving at least one channel state information report on at least one physical uplink shared channel, physical uplink control channel, or a combination thereof based on the at least one channel state information report setting. Each transmission and reception point of the at least one transmission and reception point includes a transmission point, a reception point, a node, a panel, a communication associated with a control resource set pool, a communication associated with a transmission configuration indicator state from a transmission configuration having at least two transmission configuration indicator states, or a combination thereof.

Another apparatus for channel state information reporting includes a network device. In some embodiments, the apparatus includes a transmitter that: transmits at least one channel state information report setting, wherein each channel state information report setting of the at least one channel state information report setting triggers at least one channel state information resource setting; transmits at least one set of reference signals transmitted from at least one transmission and reception point in a network according to the at least one channel state information resource setting; and transmits an indication of channel state information measurement, channel state information reporting, or a combination thereof corresponding to a single frequency network scheme for the at least one transmission and reception point in the network. In various embodiments, the apparatus includes a receiver that receives at least one channel state information report on at least one physical uplink shared channel, physical uplink control channel, or a combination thereof based on the at least one channel state information report setting. Each transmission and reception point of the at least one transmission and reception point includes a transmission point, a reception point, a node, a panel, a communication associated with a control resource set pool, a communication associated with a transmission configuration indicator state from a transmission configuration having at least two transmission configuration indicator states, or a combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a schematic block diagram illustrating one embodiment of ASN.1 code for a CSI-ReportConfig reporting setting IE corresponding to the sixth embodiment;

FIG. 5 is a schematic block diagram illustrating one embodiment of ASN.1 code for a CSI-ReportConfig reporting setting IE corresponding to the seventh embodiment;

FIG. 6 is a schematic block diagram illustrating one embodiment of ASN.1 code for triggering a CSI Report with two PMI within a CSI-ReportConfig reporting setting IE corresponding to the second example of the first embodiment of the fourth set of embodiments;

FIG. 7 is a schematic block diagram illustrating one embodiment of ASN.1 code for triggering a CSI Report with two PMI within a CSI-ReportConfig reporting setting IE corresponding to the fourth example of the first embodiment of the fourth set of embodiments;

FIG. 9 is a flow chart diagram illustrating another embodiment of a method for channel state information reporting.

DETAILED DESCRIPTION

Figure 1:
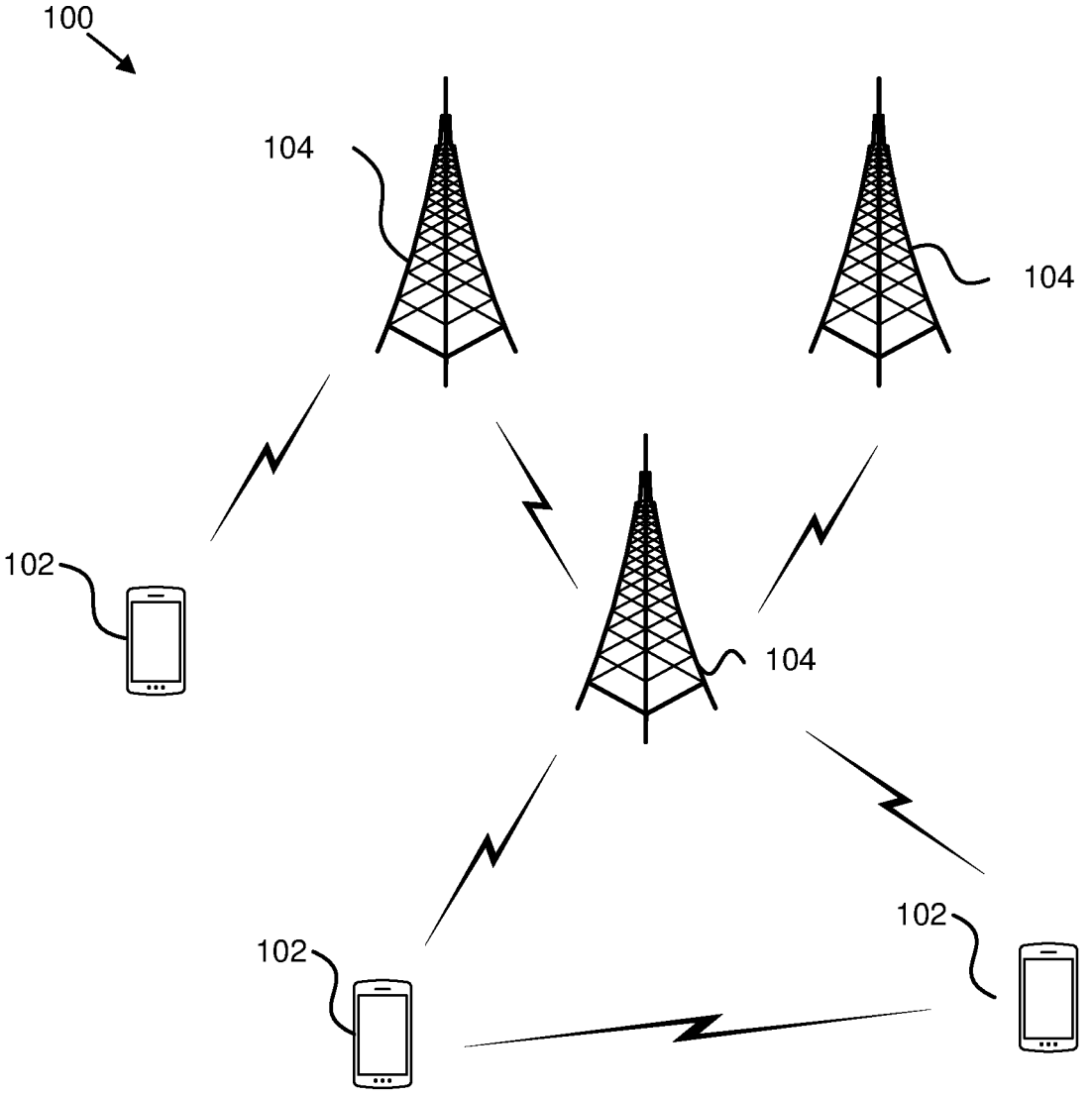
FIG. 1 is a schematic block diagram illustrating one embodiment of a wireless communication system for channel state information reporting.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for channel state information reporting. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive at least one channel state information report setting. Each channel state information report setting of the at least one channel state information report setting triggers at least one channel state information resource setting. In some embodiments, the remote unit 102 may receive at least one set of reference signals transmitted from at least one transmission and reception point in a network according to the at least one channel state information resource setting. In certain embodiments, the remote unit 102 may receive an indication of channel state information measurement, channel state information reporting, or a combination thereof corresponding to a single frequency network scheme for the at least one transmission and reception point in the network. In various embodiments, the remote unit 102 may transmit at least one channel state information report on at least one physical uplink shared channel, physical uplink control channel, or a combination thereof based on the at least one channel state information report setting. Each transmission and reception point of the at least one transmission and reception point includes a transmission point, a reception point, a node, a panel, a communication associated with a control resource set pool, a communication associated with a transmission configuration indicator state from a transmission configuration having at least two transmission configuration indicator states, or a combination thereof. Accordingly, the remote unit 102 may be used for channel state information reporting.

In certain embodiments, a network unit 104 may transmit at least one channel state information report setting. Each channel state information report setting of the at least one channel state information report setting triggers at least one channel state information resource setting. In some embodiments, the network unit 104 may transmit at least one set of reference signals transmitted from at least one transmission and reception point in a network according to the at least one channel state information resource setting. In certain embodiments, the network unit 104 may transmit an indication of channel state information measurement, channel state information reporting, or a combination thereof corresponding to a single frequency network scheme for the at least one transmission and reception point in the network. In various embodiments, the network unit 104 may receive at least one channel state information report on at least one physical uplink shared channel, physical uplink control channel, or a combination thereof based on the at least one channel state information report setting. Each transmission and reception point of the at least one transmission and reception point includes a transmission point, a reception point, a node, a panel, a communication associated with a control resource set pool, a communication associated with a transmission configuration indicator state from a transmission configuration having at least two transmission configuration indicator states, or a combination thereof. Accordingly, the network unit 104 may be used for channel state information reporting.

Figure 2:
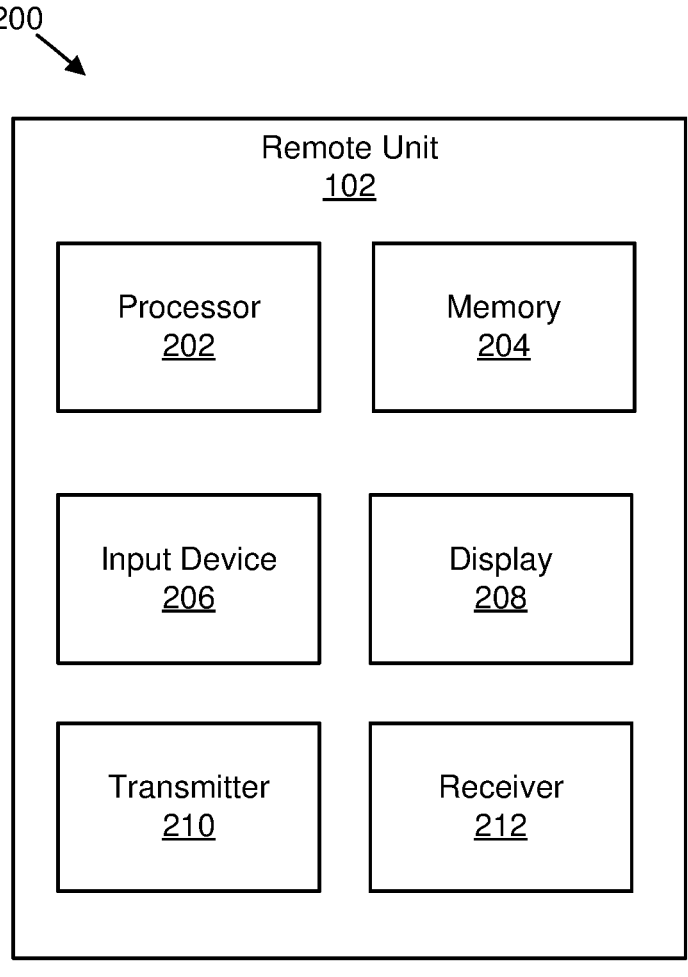
FIG. 2 is a schematic block diagram illustrating one embodiment of an apparatus that may be used for channel state information reporting.

FIG. 2 depicts one embodiment of an apparatus 200 that may be used for channel state information reporting. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212: receives at least one channel state information report setting, wherein each channel state information report setting of the at least one channel state information report setting triggers at least one channel state information resource setting; receives at least one set of reference signals transmitted from at least one transmission and reception point in a network according to the at least one channel state information resource setting; and receives an indication of channel state information measurement, channel state information reporting, or a combination thereof corresponding to a single frequency network scheme for the at least one transmission and reception point in the network. In various embodiments, the transmitter 210 transmits at least one channel state information report on at least one physical uplink shared channel, physical uplink control channel, or a combination thereof based on the at least one channel state information report setting. Each transmission and reception point of the at least one transmission and reception point includes a transmission point, a reception point, a node, a panel, a communication associated with a control resource set pool, a communication associated with a transmission configuration indicator state from a transmission configuration having at least two transmission configuration indicator states, or a combination thereof.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
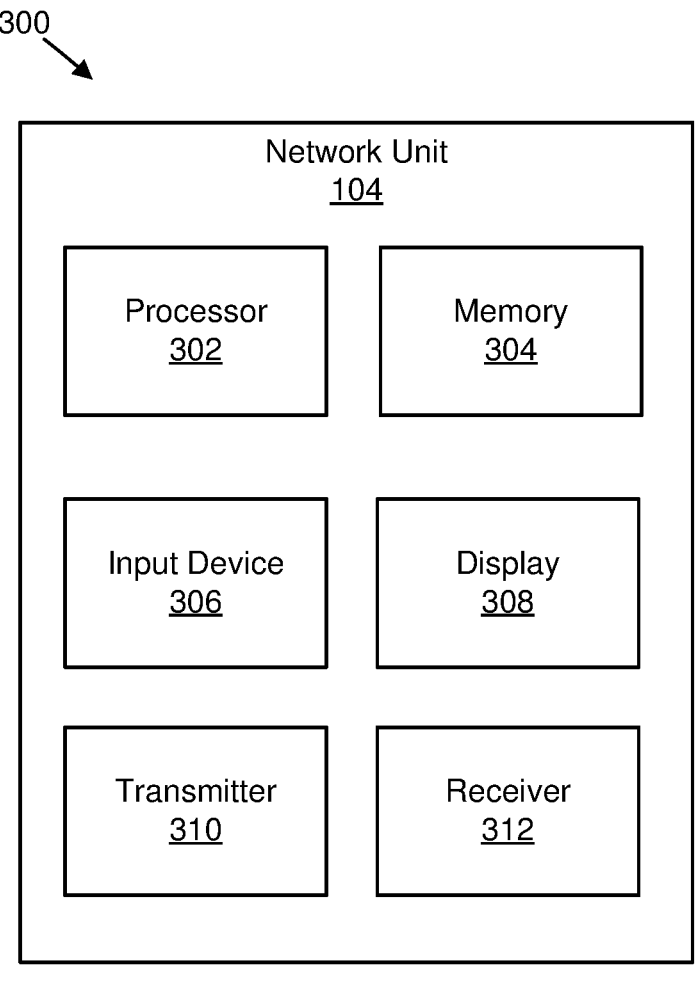
FIG. 3 is a schematic block diagram illustrating one embodiment of an apparatus that may be used for channel state information reporting.

FIG. 3 depicts one embodiment of an apparatus 300 that may be used for channel state information reporting. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: transmits at least one channel state information report setting, wherein each channel state information report setting of the at least one channel state information report setting triggers at least one channel state information resource setting; transmits at least one set of reference signals transmitted from at least one transmission and reception point in a network according to the at least one channel state information resource setting; and transmits an indication of channel state information measurement, channel state information reporting, or a combination thereof corresponding to a single frequency network scheme for the at least one transmission and reception point in the network. In various embodiments, the receiver 312 receives at least one channel state information report on at least one physical uplink shared channel, physical uplink control channel, or a combination thereof based on the at least one channel state information report setting. Each transmission and reception point of the at least one transmission and reception point includes a transmission point, a reception point, a node, a panel, a communication associated with a control resource set pool, a communication associated with a transmission configuration indicator state from a transmission configuration having at least two transmission configuration indicator states, or a combination thereof.

In certain locations, high speed rail is expanding, such as in Europe and Asia, alongside their number of passengers with smart devices like laptops and mobile phones. Current technologies may support data ranges from tens of kbps to tens of Mbps which may not be enough to handle a demand for high-data-rates and increased reliability and/or latency for on-board broadband services.

In some embodiments, such as in single-frequency network ("SFN") configurations, multiple remote radio heads are located along a railway and connected to a central unit (e.g., via fiber). The remote radio heads may share the same cell identifier ("ID"). If transmissions from transmission and reception points ("TRPs") within a cell are synchronized, SFN deployment may enlarge a cell coverage, reduce a frequency of handovers, and achieve transmission diversity and power gain. Based on a 6 dB pathloss difference between any two TRPs, a train may take advantage of simultaneous two TRP transmissions for sessions of at least 4 seconds long, assuming a train speed of 500 km/hr.

In various embodiments, such as for SFN transmission, a physical downlink shared channel ("PDSCH") is repeated from two TRPs using a single scheduling downlink control information ("DCI") indicating a single demodulation reference signal ("DMRS") port and a single transmission configuration indicator ("TCI") state.

In certain embodiments, multiple TRPs or multi-antenna panels within a TRP may communicate simultaneously with one user equipment ("UE") to enhance coverage, throughput, and/or reliability. This may come at the expense of excessive control signaling between a network side and a UE side to communicate a best transmission configuration (e.g., whether to support multi-point transmission, and if so, which TRPs would operate simultaneously, in addition to a possibly super-linear increase in the amount of CSI feedback reported from the UE to the network, since more CSI feedback may be needed for each transmission configuration). In some embodiments, such as for Rel. 16 Type-II codebook with high resolution, a number of precoder matrix indicator ("PMI") bits fed back from the UE in a gNB via uplink control information ("UCI") may be very large (e.g., >1000 bits at a large bandwidth), even for a single-point transmission. Reducing a number of CSI feedback bits may be crucial to improve efficiency. In various embodiments, multiple-input multiple-output ("MIMO") enhancements may include multi-TRP ("mTRP") and multi-panel transmissions. In such embodiments, high speed train ("HST") SFN ("HST-SFN") transmission may be used to achieve ubiquitous connectivity for UEs along a train trajectory.

In certain embodiments, there may be CSI measurement and reporting for HST-SFN, where two or more TRPs communicate with the same UE simultaneously with a portion of the reference signals and data transmitted in SFN manner from the TRPs. The remaining portion may be transmitted in a TRP-specific manner. In some embodiments, in a HST-SFN system, there may be: 1) an indication of CSI measurement and/or reporting; 2) channel state information ("CSI") reference signal ("RS") ("CSI-RS") triggering and transmission; and/or 3) CSI feedback reporting.

Various embodiments are described herein. It should be noted that one or more elements or features from one or more of the embodiments herein may be combined (e.g., for CSI measurement, feedback generation, and/or reporting which may reduce overall CSI feedback overhead).

In certain embodiments herein, one or more of the following may apply: 1) "TRP" may include TRPs, nodes, panels, communication (e.g., signals and/or channels) associated with a control resource set ("CORESET") pool, and/or communication associated with a TCI state from a transmission configuration comprising at least two TCI states; 2) a codebook type used may be arbitrary (e.g., there may be flexibility for use of different codebook types (Type-I and Type-II codebooks) unless otherwise stated); 3) a single DCI that triggers a UE is assumed where an mTRP scheme is based on a SFN transmission of one or more of a PDSCH, a physical downlink control channel ("PDCCH"), and RSs from one or more TRPs—a subset of the TRPs are transmitted as non-SFN transmission from one or more TRPs; and/or 4) a TRS may refer to a non-zero power ("NZP") CSI-RS resource set (e.g., NZP-CSI-RS-Resource- Set) configured with a higher-layer parameter (e.g., trs-Info). A CSI-RS resource and/or resource set for beam management ("BM") may denote an NZP CSI-RS resource set (e.g., NZP-CSI-RS-ResourceSet) configured with higher-layer parameter repetition. In some embodiments, a CSI-RS resource and/or resource set may denote an NZP CSI-RS resource and/or resource set configured without higher-layer parameter trs-Info and without higher-layer parameter repetition.

In various embodiments, a UE may be configured by higher layers with one or more CSI-ReportConfig reporting settings for CSI reporting, one or more CSI-ResourceConfig resource settings for CSI measurement, and one or two lists of trigger states (e.g., given by the higher layer parameters CSI-AperiodicTriggerStateList and CSI-SemiPersistentOn-PUSCH-TriggerStateList). Each trigger state in CSI-AperiodicTriggerStateList may contain a list of a subset of associated CSI-ReportConfigs indicating resource set IDs for channel and optionally for interference. Each trigger state in CSI-SemiPersistentOnPUSCH-TriggerStateList may contain one or more associated CSI-ReportConfig.

In a first set of embodiments, there may be an indication of CSI reporting configuration for HST-SFN. In the first set of embodiments, there may be multiple embodiments for indication of CSI reporting configuration for HST-SFN. A combination of one or more of the embodiments in the first set of embodiments is possible.

In a first embodiment of the first set of embodiments, a UE is configured with a CSI reporting setting for a HST-SFN scheme whenever a higher-layer parameter that configures the HST-SFN scheme (e.g., highSpeed-flag) is configured and/or set to true. The higher-layer parameter may appear in DMRS-DownlinkConfig IE, DownlinkConfigCommon IE, ServingCellConfig, PDSCH-Config, PDSCH-ServingCell-Config, or BWP-DownlinkDedicated.

In a second embodiment of the first set of embodiments, a UE is configured with a CSI reporting setting for a HST-SFN scheme whenever an additional bit is in a DCI field or an additional parameter is indicated by an existing field in DCI (e.g., DCI field 'Transmission Configuration Indication' may indicate TCI states and whether offset frequency pre-compensation is applied) (e.g., by configuring a higher layer parameter such as highSpeed-PresentInDCI).

In a third embodiment of the first set of embodiments, a UE is configured with a CSI reporting setting for a HST-SFN scheme whenever a UE is configured with a TCI state that indicates a TRS is quasi-co-located with a DMRS for PDSCH and/or DMRS for PDCCH via one or more quasi-co-location ("QCL") types that do not include either Doppler shift or Doppler spread. In one example, a new QCL type 'QCL-TypeE' is used that indicates that a TRS is QCLed with a DMRS for PDSCH and/or a DMRS for PDCCH in terms of one of the following four sets of large-scale parameters ({Average Delay, Delay spread}, {Average Delay}, {Delay Spread}, {None}) and 'QCL-TypeD', if applicable.

In a fourth embodiment of the first set of embodiments, a UE is configured with a CSI reporting setting for a HST-SFN scheme whenever a UE is configured with two TRSs.

In a fifth embodiment of the first set of embodiments, a UE is configured with a CSI reporting setting for a HST-SFN scheme whenever a UE is triggered with a DCI that includes a TCI codepoint that refers to two TCI states.

In a sixth embodiment of the first set of embodiments, a UE is configured with a CSI reporting setting for a HST-SFN scheme whenever a higher-layer parameter (e.g., highSpeed-CSI-Enabled) is configured in a report setting that indicates the CSI reporting setting is for the HST-SFN scheme. An example of the ASN.1 code the corresponds to the CSI-ReportConfig reporting setting IE is provided in FIG. 4. Specifically, FIG. 4 is a schematic block diagram illustrating one embodiment of abstract syntax notation one ("ASN.1") code for a CSI-ReportConfig reporting setting information element ("IE") 400 corresponding to the sixth embodiment.

In a seventh embodiment of the first set of embodiments, a UE is configured with a CSI reporting setting for a HST-SFN scheme whenever one resourcesForChannelMeasurement NZP CSI-RS, and one resourcesForChannel1Measurement NZP CSI-RS are defined, where each corresponds to different NZP CSI-RS resources and/or resource sets. The UE may feed back two CSIs corresponding to one or two codebook configurations (e.g., codebookConfig), or two of the same CSI report quantity reportQuantity (e.g., PMI), wherein each CSI and/or report quantity corresponds to one of the two NZP CSI-RS resources and/or resource sets in resourcesForChannelMeasurement and resourcesForChannel1Measurement. An example of the ASN.1 code the corresponds to the CSI-ReportConfig reporting setting IE is provided in FIG. 5. Specifically, FIG. 5 is a schematic block diagram illustrating one embodiment of ASN.1 code for a CSI-ReportConfig reporting setting IE 500 corresponding to the seventh embodiment.

In an eighth embodiment of the first set of embodiments, a UE is configured with a CSI reporting setting for a HST-SFN scheme whenever the it is triggered to feed back one or more of the same CSI report quantity (e.g., CSI-RS resource index ("CRI"), synchronization signal ("SS") and/or physical broadcast channel ("PBCH") ("SS/PBCH") block resource index ("SSBRI"), rank indicator ("RI"), PMI), wherein one or more of the higher-layer parameters reportQuantity and reportQuantity-r16 in the reporting setting are set to a value that includes two quantities (e.g., the parameter reportQuantity is set to '2CRI-RI-2PMI-CQI').

In a second set of embodiments, there may be CSI-RS grouping. In the second set of embodiments, there may be multiple embodiments for CSI resource configuration for HST-SFN. A combination of one or more embodiments of the second set of embodiments may be made.

In a first embodiment of the second set of embodiments, two groups or lists of NZP CSI-RS resource sets may be identified. Each of the two groups includes one or more NZP CSI-RS resource sets.

In a second embodiment of the second set of embodiments, two groups of NZP CSI-RS resources may be identified. Each of the two groups includes one or more NZP CSI-RS resources. In one example, each group of NZP CSI-RS resources is an NZP CSI-RS resource set (e.g., first group of NZP CSI-RS resources is a first NZP CSI-RS resource set, and the second group of NZP CSI-RS resources is a second NZP CSI-RS resource set). In another example, the two groups of NZP CSI-RS resources are subsets of the NZP CSI-RS resources of an NZP CSI-RS resource set (e.g., NZP CSI-RS resource set comprises the first group of NZP CSI-RS resources and the second group of NZP CSI-RS resources).

In a third embodiment of the second set of embodiments, two groups of NZP CSI-RS ports are identified, wherein each group includes one or more NZP CSI-RS ports. In one example, each group of NZP CSI-RS ports is an NZP CSI-RS resource (e.g., first group of NZP CSI-RS ports is a first NZP CSI-RS resource, and the second group of NZP CSI-RS ports is a second NZP CSI-RS resource). The first NZP CSI-RS resource and the second NZP CSI-RS resource may be elements of the same or different NZP CSI-RS resource sets. In another example, the two groups of NZP CSI-RS ports are subsets of an NZP CSI-RS resource (e.g., NZP CSI-RS resource comprises the first group of NZP CSI-RS ports and the second group of NZP CSI-RS ports).

In a third set of embodiments, there may be an identification of CSI-RS groups. Based on the different grouping of the CSI-RS (e.g., resource sets, resources, or ports), different embodiments of how the UE may differentiate the CSI-RS groups are found in the third set of embodiments. A combination of one or more of the embodiments of the third set of embodiments may be made.

In a first embodiment of the third set of embodiments, different CSI-RS groups may be identified by a UE via QCL relationships indicated in a TCI state (e.g., QCL relationships between NZP CSI-RS and TRS).

In a second embodiment of the third set of embodiments, different CSI-RS groups may be identified by a UE from one or more of the fields in the CSI-ReportConfig reporting setting, or the CSI-ResourceConfig resource setting. In one example, a list of the IDs of the CSI-RS resource sets corresponding to one or more groups are listed within the CSI resource setting. In another example, a list of the IDs of the CSI-RS resources corresponding to one or more groups are listed within an NZP-CSI-RS resource set of the CSI resource setting.

In a third embodiment of the third set of embodiments, different CSI-RS groups may be identified by a pre-defined rule. In one example, if S NZP CSI-RS resource sets are configured, the first $\lceil S/2 \rceil$ NZP CSI-RS resource sets correspond to a first CSI-RS group, whereas the last $\lfloor S/2 \rfloor$ NZP CSI-RS resource sets correspond to a second CSI-RS group. In another example, if R NZP CSI-RS resources are configured, the first $\lceil R/2 \rceil$ NZP CSI-RS resources correspond to a first CSI-RS group, whereas the last $\lfloor R/2 \rfloor$ NZP CSI-RS resources correspond to a second CSI-RS group. In yet another example, if P NZP CSI-RS ports are configured (e.g., where P is an even number), the first P/2 NZP CSI-RS ports correspond to a first CSI-RS group, whereas the last P/2 NZP CSI-RS ports correspond to a second CSI-RS group.

In a fourth set of embodiments, there may be CSI reporting triggering. CSI feedback may be reported over PUSCH, PUCCH, or both. CSI feedback time-domain behavior may be periodic, semi-persistent, or aperiodic. One or more CSI reports corresponding to one or more TRPs, or one or more channel hypotheses, or both, may be transmitted. CSI feedback can be reported jointly (e.g., one CSI report corresponds to one or more TRPs, one or more channel hypotheses or both). In certain embodiments, CSI feedback may be reported separately (e.g., one CSI report corresponds to one TRP, one channel hypothesis, or both). One CSI-ReportConfig reporting setting may configure one or more CSI reports. Different embodiments of CSI reporting formats under a given reporting setting are provided herein. A setup with a combination of one or more of embodiments herein may be made.

In a first embodiment of the fourth set of embodiments, a UE is triggered to feed back a single CSI report configured in a reporting setting. The CSI report includes more than one quantity of each of one or more of the following: CRI, SSBRI, and/or PMI (e.g., two PMI values and one CRI value).

In a first example of the first embodiment of the fourth set of embodiments, one or more of a higher-layer parameter representing a report quantity (e.g., reportQuantity, reportQuantity-r16, reportQuantity-r17 in the reporting setting) is set to a value that includes two quantities for one or more of the CRI, SSBRI, and/or PMI (e.g., the parameter reportQuantity is set to '2CRI-RI-2PMI-CQI').

In a second example of the first embodiment of the fourth set of embodiments, the reporting setting configures two or more CodebookConfig codebook configurations within a reporting setting, each corresponding to one or more PMIs. An example of the ASN.1 code that corresponds to the CSI-ReportConfig reporting setting IE is provided in FIG. 6. Specifically, FIG. 6 is a schematic block diagram illustrating one embodiment of ASN.1 code 600 for triggering a CSI Report with two PMI within a CSI-ReportConfig reporting setting IE corresponding to the second example of the first embodiment of the fourth set of embodiments.

In a third example of the first embodiment of the fourth set of embodiments, the reporting setting configures one CodebookConfig codebook configuration which either jointly configures two or more codebooks within the same CSI report via one joint configuration, or configures one codebook configuration with the second codebook configuration being configured via one or more pre-defined rules that may be based on the first codebook configuration.

In a fourth example of the first embodiment of the fourth set of embodiments, a higher layer parameter is configured within a CSI-ReportConfig IE or another IE therein (e.g., codebookConfig) that corresponds to one or more of a number of PMI or CRI that should be reported by the UE (e.g., higher-layer parameter nPMI) which may be set to multiple values (e.g., {1,2}). An example of the ASN.1 code that corresponds to the CSI-ReportConfig reporting setting IE is provided in FIG. 7. Specifically, FIG. 7 is a schematic block diagram illustrating one embodiment of ASN.1 code 700 for triggering a CSI Report with two PMI within a CSI-ReportConfig reporting setting IE corresponding to the fourth example of the first embodiment of the fourth set of embodiments.

In a fifth example of the first embodiment of the fourth set of embodiments, a UE is triggered to feed back two or more quantities of each of one or more of the PMI, CRI, SSBRI within a CSI report configured in a reporting setting. The triggering of the two or more quantities is inferred from the one or more indications of CSI reporting for a HST-SFN scheme.

It should be noted that any of the examples described herein may be combined (e.g., combining the second and fourth examples with two codebook configurations specified for the two indicated PMI quantities). Moreover, each of two PMI may be configured with a different CSI-RS group.

In a second embodiment of the fourth set of embodiments, a UE may be triggered to feed back two CSI reports configured in a reporting setting.

In a first example of the second embodiment of the fourth set of embodiments, two or more values of a higher-layer parameter corresponding to a report quantity (e.g., reportQuantity, reportQuantity-r16, reportQuantity-r17) are set in a reporting setting (e.g., two values are set for the parameter reportQuantity: 'CRI-RI-LI-PMI-CQI' and 'CRI-PMI' for first and second CSI reports, respectively).

In a second example of the second embodiment of the fourth set of embodiments, the reporting setting configures two or more CodebookConfig codebook configurations within a reporting setting, each corresponding to one of the two CSI reports.

In a third example of the second embodiment of the fourth set of embodiments, the reporting setting configures one CodebookConfig codebook configuration which jointly configures two or more codebooks across two CSI reports via one joint configuration, or configures one codebook configuration in one CSI report with the second codebook configuration in a second CSI report being configured via one or more pre-defined rules that may be based on the first codebook configuration.

In a fourth example of the second embodiment of the fourth set of embodiments, a higher layer parameter is configured within the CSI-ReportConfig IE or another IE therein (e.g., codebookConfig) that corresponds to one or more of a number of CSI reports that may be reported by the UE (e.g., higher-layer parameter nCSIreports) which may be set to multiple values (e.g., {1,2}).

In a fifth example of the second embodiment of the fourth set of embodiments, a UE is triggered to feed back two or more CSI reports configured in a reporting setting. The triggering of the two CSI reports may be inferred from the one or more indications of CSI reporting for a HST-SFN scheme.

It should be noted that different examples may be combined (e.g., combining the second and fourth examples with two codebook configurations specified for the two CSI reports). Each of two CSI reports may be configured with a different CSI-RS group.

In a third embodiment of the fourth set of embodiments, a UE is triggered to feed back a single CSI report configured in a reporting setting. The CSI report includes no more than one quantity of each of one or more of the following quantities: CRI, SSBRI, and PMI (e.g., one PMI value and one CRI value).

In a first example of the third embodiment of the fourth set of embodiments, at least a PMI and an RI are configured to be reported by the UE. The number of layers in one PMI is double the indicated RI value.

In a second example of the third embodiment of the fourth set of embodiments, at least a PMI and an RI are configured to be reported by the UE. The codebook type configured within the codebook configuration is set to 'typeI-Multi-Panel', wherein the PMI corresponding to a first panel may correspond to one group of CSI-RS resources (or resource sets or ports), and the PMI corresponding to a second panel may correspond to a second group of CSI-RS resources (or resource sets or ports).

In a third example of the third embodiment of the fourth set of embodiments, a UE is triggered to feed back a PMI with the number of layers being double that of the value of the RI whenever one or more indications of CSI reporting for a HST-SFN scheme are triggered. It should be noted that layers within a PMI may be decomposed into two equal-sized layer groups, wherein the number of layers in each of the layer groups is equal to the value of RI.

It should be noted that examples herein may be combined (e.g., combining the first and third examples with a PMI including double the number of layers indicated in the RI) with an indication of CSI reporting for HST-SFN. Moreover, each of the two layer-groups within the PMI may be configured with a different CSI-RS group.

In a fifth set of embodiments, there may be a CSI report structure for a HST-SFN scheme. CSI feedback may be reported in UCI over PUSCH, PUCCH, or both, wherein a codebook type is configured to report the PMI as well as other CSI report quantities. Codebook types may vary between a Type-I and Type-II, wherein each CSI report includes at least two parts: CSI Part 1 and CSI Part 2, where CSI Part 1 has a fixed payload size and is transmitted in its entirety prior to CSI Part 2. The values reported in CSI Part 1 may depict the size of CSI Part 2. For Type-II codebooks, CSI Part 2 may be further decomposed into multiple groups, wherein the last one or more groups of Part 2 of the CSI report may be omitted from transmission if the UCI bit allocation is not sufficient to feedback all CSI reports in their entirety. Different embodiments of CSI report structures are provided herein. A setup with a combination of one or more of the embodiments herein may be made.

In a first embodiment of the fifth set of embodiments, a CSI report for a HST-SFN scheme may only support a Type-I codebook type. In one example, only 'typeI-SinglePanel' codebook type is supported.

In a second embodiment of the fifth set of embodiments, a maximum RI supported in a CSI Report for a HST-SFN scheme may be smaller than that specified for other scenarios. In one example, the maximum RI value reported is set to '4' whenever the codebook type is set to 'typeI-SinglePanel'. In another example, the maximum RI value reported is set to '2' whenever the codebook type is set to 'typeII-r16'.

In a third embodiment of the fifth set of embodiments, an indication of one or more Doppler shift values may be reported in a CSI report. In one example, a differential Doppler shift value is reported in CSI Part 2 of a CSI report.

In a fourth embodiment of the fifth set of embodiments, whenever multiple PMI can be fed back in a single CSI report, an indicator may be added to CSI Part 1 that indicates whether two PMI (or CRI or both) are reported in full within the CSI report.

In a first example, the indicator in CSI Part 1 is a single-bit Boolean parameter that, when set to false, a UE reports one PMI only, even though it is configured to report up to 2 PMI quantities in the same CSI report.

In a second example, the indicator in CSI Part 1 is a single-bit Boolean parameter that when set to false, a UE reports one PMI in full, whereas the other PMI is partially fed back, following an UCI omission procedure.

In a third example, the indicator in CSI Part 1 is a two-bit parameter, wherein the first bit indicates whether one or two PMI are reported. If the first bit indicates one PMI is reported, the second bit may indicate which one of the two PMI is reported. In some example, states or codepoints of the two-bit parameter may be used to indicate {first PMI, second PMI, first PMI and second PMI} reported.

In a fourth example, the indicator in CSI Part 1 is a two-bit parameter, wherein the first bit indicates whether two PMI are reported in full, or only one PMI is reported in full while the other PMI is partially reported. If the first bit indicates only one PMI is reported in full, the second bit may indicate which one of the two PMI is fully reported. In some example, states or codepoints of the two-bit parameter may be used to indicate {first PMI, second PMI, first PMI and second PMI partial} reported.

In a fifth example, the indicator in CSI Part 1 is a single-bit Boolean parameter that if set to false, a UE reports one PMI only, even though it is configured to report up to 2 PMI quantities in the same CSI report. A single-bit Boolean parameter is also added to CSI Part 2 conditioned on the configuration of the parameter in CSI Part 1, wherein the CSI Part 2 parameter indicates which one of the two PMI is reported.

In a sixth example, the indicator in CSI Part 1 is a single-bit Boolean parameter that if set to false, a UE reports one PMI in full, whereas the other PMI is partially fed back, following an UCI omission procedure. A single-bit Boolean parameter may also be added to CSI Part 2 conditioned on the configuration of the parameter in CSI Part 1, wherein the CSI Part 2 parameter indicates which one of the two PMI is fully reported.

In a sixth set of embodiments, there may be CSI-RS under offset frequency pre-compensation. Based on the CSI-RS grouping, different CSI-RS groups may incur different large-scale fading parameters and hence different QCL relationships based on a HST-SFN scheme. Different embodiments of CSI report structures are provided herein. Indeed, a setup with a combination of one or more embodiments herein may be made.

In a first embodiment of the sixth set of embodiments, for the DMRS of PDSCH (or the DMRS of PDCCH, or both), a UE may expect that a TCI-State indicates 'QCL-TypeA' with one (or a subset of) CSI-RS group, and, when applicable, 'QCL-TypeD' with the same CSI-RS group. The UE may also expect that a TCI-State indicates 'QCL-TypeE' with a second (or a subset of) CSI-RS group.

In a second embodiment of the sixth set of embodiments, for elements of one CSI-RS group, the UE may expect that a TCI-State indicates 'QCL-TypeA' with TRS, and, when applicable, 'QCL-TypeD' with the same TRS. For elements of a second CSI-RS group, the UE may expect that a TCI-State indicates 'QCL-TypeE' with a second TRS.

It should be noted that 'QCL-TypeE' may refer to one of the following large-scale parameters: 1) 'QCL-TypeE': {average delay, delay spread}; 2) 'QCL-TypeE': {average delay}; 3) 'QCL-TypeE': {delay spread}; and 4) 'QCL-TypeE': none.

In some embodiments, the terms antenna, panel, and antenna panel are used interchangeably. An antenna panel may be hardware that is used for transmitting and/or receiving radio signals at frequencies lower than 6 GHz (e.g., frequency range 1 ("FR1")), or higher than 6 GHz (e.g., frequency range 2 ("FR2") or millimeter wave ("mmWave")). In certain embodiments, an antenna panel may include an array of antenna elements. Each antenna element may be connected to hardware, such as a phase shifter, that enables a control module to apply spatial parameters for transmission and/or reception of signals. The resulting radiation pattern may be called a beam, which may or may not be unimodal and may allow the device to amplify signals that are transmitted or received from spatial directions.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices the information may be used for signaling or local decision making.

In some embodiments, a UE antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/pr unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}. Other QCL-Types may be defined based on combination of one or large-scale properties.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In certain embodiments, QCL-TypeA, QCL-TypeB, and QCL-TypeC may be applicable for all carrier frequencies, but QCL-TypeD may be applicable only in higher carrier frequencies (e.g., mmWave, FR2, and beyond), where the UE may not be able to perform omni-directional transmission (e.g., the UE would need to form beams for directional transmission). For a QCL-TypeD between two reference signals A and B, the reference signal A is considered to be spatially co-located with reference signal B and the UE may assume that the reference signals A and B can be received with the same spatial filter (e.g., with the same RX beamforming weights).

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In certain embodiments, a transmission configuration indicator ("TCI") state ("TCI-state") associated with a target transmission may indicate parameters for configuring a quasi-co-location relationship between the target transmission (e.g., target RS of demodulation ("DM") reference signal ("RS") ("DM-RS") ports of the target transmission during a transmission occasion) and a source reference signal (e.g., synchronization signal block ("SSB"), CSI-RS, and/or sounding reference signal ("SRS")) with respect to quasi co-location type parameters indicated in a corresponding TCI state. The TCI describes which reference signals are used as a QCL source, and what QCL properties may be derived from each reference signal. A device may receive a configuration of a plurality of transmission configuration indicator states for a serving cell for transmissions on the serving cell. In some embodiments, a TCI state includes at least one source RS to provide a reference (e.g., UE assumption) for determining QCL and/or a spatial filter.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

Figure 8:
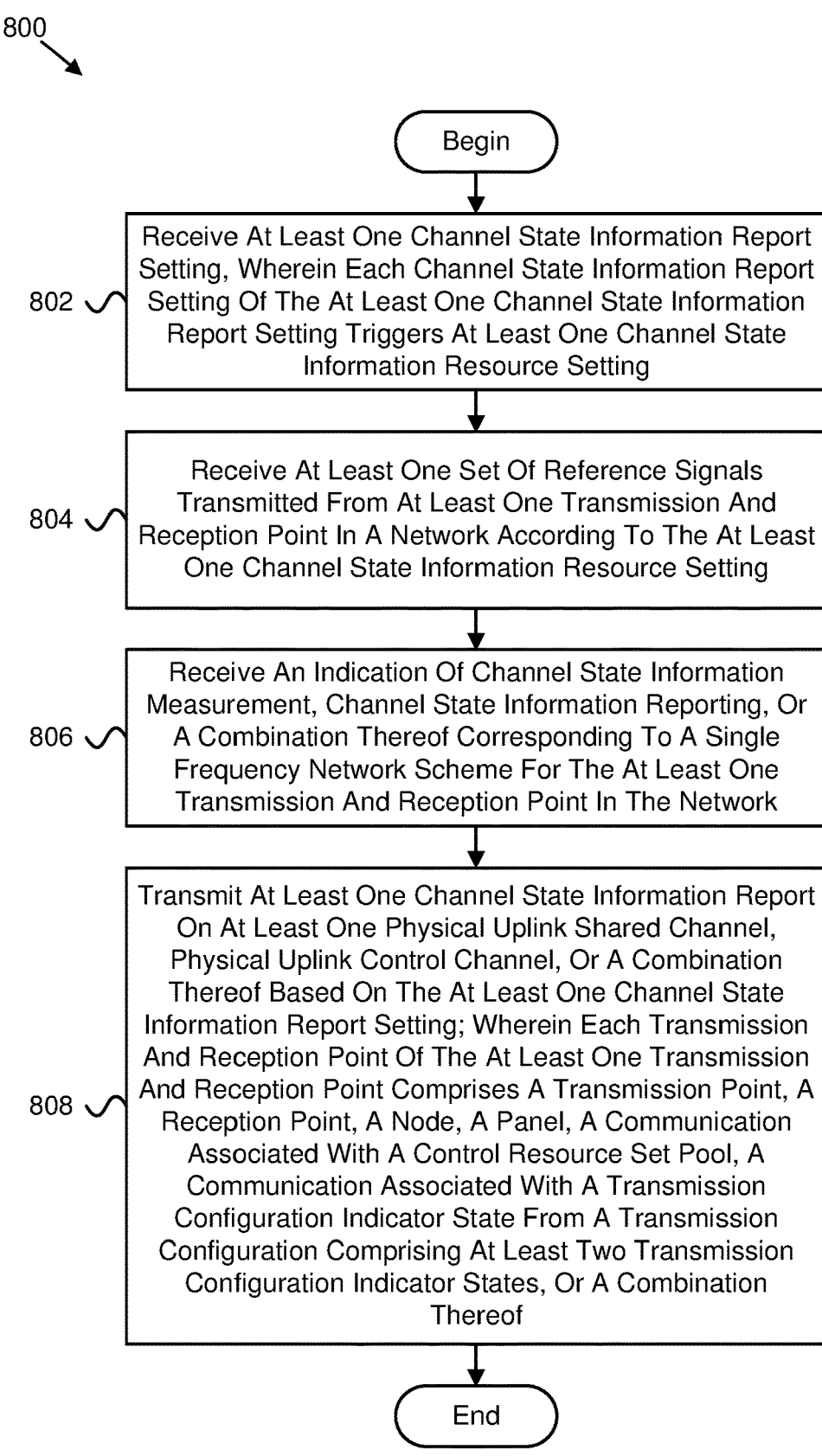
FIG. 8 is a flow chart diagram illustrating one embodiment of a method for channel state information reporting.

FIG. 8 is a flow chart diagram illustrating one embodiment of a method 800 for channel state information reporting. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes receiving 802 at least one channel state information report setting. Each channel state information report setting of the at least one channel state information report setting triggers at least one channel state information resource setting. In some embodiments, the method 800 includes receiving 804 at least one set of reference signals transmitted from at least one transmission and reception point in a network according to the at least one channel state information resource setting. In certain embodiments, the method 800 includes receiving 806 an indication of channel state information measurement, channel state information reporting, or a combination thereof corresponding to a single frequency network scheme for the at least one transmission and reception point in the network. In various embodiments, the method 800 includes transmitting 808 at least one channel state information report on at least one physical uplink shared channel, physical uplink control channel, or a combination thereof based on the at least one channel state information report setting. Each transmission and reception point of the at least one transmission and reception point includes a transmission point, a reception point, a node, a panel, a communication associated with a control resource set pool, a communication associated with a transmission configuration indicator state from a transmission configuration having at least two transmission configuration indicator states, or a combination thereof.

In certain embodiments, the indication of the channel state information measurement, the channel state information reporting, or the combination thereof comprises: indicating the single frequency network scheme using a high layer parameter; indicating the single frequency network scheme using at least one downlink configuration indicator bit; indicating the single frequency network scheme based on a presence of two tracking reference signals; indicating the single frequency network scheme using a joint transmission configuration indicator state configuration; indicating the single frequency network scheme using a parameter in a channel state information report configuration; indicating the single frequency network scheme using two channel state information reference signal resources; indicating the single frequency network scheme using a report quantity in the channel state information report configuration; or some combination thereof.

In some embodiments, at least one channel state information reference signal is grouped into two channel state information reference signal groups corresponding to: different channel state information reference signal resource sets for different transmission and reception points; different channel state information reference signal resources of one channel state information reference signal resource set; different channel state information reference signal ports of the same channel state information reference signal resource; or a combination thereof. In various embodiments, the two channel state information reference signal groups are based on: a quasi-co-location relationship between a tracking reference signal and a channel state information reference signal in at least one channel state information reference signal group, wherein a tracking reference signal indicates a non-zero-power channel state information reference signal resource configured by a high layer parameter indicating tracking reference signal information; a quasi-co-location relationship between a demodulation reference signal of a physical downlink shared channel, a demodulation reference signal of a physical downlink control channel, or a combination thereof, and a channel state information reference signal in at least one channel state information reference signal group, and wherein the quasi-co-location relationship indicates a relationship corresponding to average delay and delay spread parameters; an indication of a channel state information reference signal resource group in a channel state information reporting configuration; an indication of the channel state information reference signal resource groups via a rule; or a combination thereof.

In one embodiment, two channel state information reports are fed back per channel state information reporting setting. In certain embodiments, a first channel state information report of the two channel state information reports comprises a channel state information reference signal resource indicator, a synchronization signal/physical broadcast channel block resource indicator, a rank indicator, a precoder matrix indicator, a layer indicator, a channel quality indicator, a layer one reference signal received power, a layer one signal-to-interference-and-noise ratio, or a combination thereof.

In some embodiments, a second channel state information report of the two channel state information reports comprises a channel state information reference signal resource indicator, a synchronization signal/physical broadcast channel block resource indicator, a precoder matrix indicator, or a combination thereof. In various embodiments, one channel state information report is fed back per channel state information report setting of the at least one channel state information report setting, the one channel state information report comprises two channel state information reference signal resource indicators, two synchronization signal/physical broadcast channel block resource indicators, a rank indicator, two precoder matrix indicators, a layer indicator, a channel quality indicator, a layer one reference signal received power, a layer one signal-to-interference-and-noise ratio, or a combination thereof, and the one channel state information report is decomposed into two channel state information parts comprising a channel state information part 1 and a channel state information part 2. In one embodiment, the one channel state information report comprises an indicator in channel state information part 1 that indicates whether one or two of a precoder matrix indicator, a channel state information reference signal resource indicator, a synchronization signal/physical broadcast channel block resource indicator, or a combination thereof, are fed back in the one channel state information report.

In certain embodiments, the indicator in the channel state information part 1 is a one-bit indicator that only indicates whether one or two of the precoder matrix indicator, the channel state information reference signal resource indicator, the synchronization signal/physical broadcast channel block resource indicator, or a combination thereof, are fed back in the one channel state information report. In some embodiments, the indicator in the channel state information part 1 is a multi-bit indicator that indicates whether one or two of the precoder matrix indicator, the channel state information reference signal resource indicator, the synchronization signal/physical broadcast channel block resource indicator, or a combination thereof, are fed back in the one channel state information report, and indicates one channel state information reference signal group of the two channel state information reference signal groups.

In various embodiments, the one channel state information report includes a dependent indicator in the channel state information part 2 in which a presence of the dependent indicator is dependent on a value of the one-bit indicator in the channel state information part 1, the one-bit indicator in the channel state information part 1 indicates whether one or two of the precoder matrix indicator, the channel state information reference signal resource indicator, the synchronization signal/physical broadcast channel block resource indicator, or a combination thereof, are fed back in the one channel state information report, and the dependent indicator in the channel state information part 2 indicates one channel state information reference signal group of the two channel state information reference signal groups. In one embodiment, the at least one channel state information report comprises an indication at least one Doppler shift value based on the channel state information measurement, and a Doppler shift value of the at least one Doppler shift value is indicated in a differential form with respect to a reference value.

FIG. 9 is a flow chart diagram illustrating another embodiment of a method 900 for channel state information reporting. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes transmitting 902 at least one channel state information report setting. Each channel state information report setting of the at least one channel state information report setting triggers at least one channel state information resource setting. In some embodiments, the method 900 includes transmitting 904 at least one set of reference signals transmitted from at least one transmission and reception point in a network according to the at least one channel state information resource setting. In certain embodiments, the method 900 includes transmitting 906 an indication of channel state information measurement, channel state information reporting, or a combination thereof corresponding to a single frequency network scheme for the at least one transmission and reception point in the network. In various embodiments, the method 900 includes receiving 908 at least one channel state information report on at least one physical uplink shared channel, physical uplink control channel, or a combination thereof based on the at least one channel state information report setting. Each transmission and reception point of the at least one transmission and reception point includes a transmission point, a reception point, a node, a panel, a communication associated with a control resource set pool, a communication associated with a transmission configuration indicator state from a transmission configuration having at least two transmission configuration indicator states, or a combination thereof.

In certain embodiments, the indication of the channel state information measurement, the channel state information reporting, or the combination thereof comprises: indicating the single frequency network scheme using a high layer parameter; indicating the single frequency network scheme using at least one downlink configuration indicator bit; indicating the single frequency network scheme based on a presence of two tracking reference signals; indicating the single frequency network scheme using a joint transmission configuration indicator state configuration; indicating the single frequency network scheme using a parameter in a channel state information report configuration; indicating the single frequency network scheme using two channel state information reference signal resources; indicating the single frequency network scheme using a report quantity in the channel state information report configuration; or some combination thereof. In some embodiments, at least one channel state information reference signal is grouped into two channel state information reference signal groups corresponding to: different channel state information reference signal resource sets for different transmission and reception points; different channel state information reference signal resources of one channel state information reference signal resource set; different channel state information reference signal ports of the same channel state information reference signal resource; or a combination thereof.

In various embodiments, the two channel state information reference signal groups are based on: a quasi-co-location relationship between a tracking reference signal and a channel state information reference signal in at least one channel state information reference signal group, wherein a tracking reference signal indicates a non-zero-power channel state information reference signal resource configured by a high layer parameter indicating tracking reference signal information; a quasi-co-location relationship between a demodulation reference signal of a physical downlink shared channel, a demodulation reference signal of a physical downlink control channel, or a combination thereof, and a channel state information reference signal in at least one channel state information reference signal group, and wherein the quasi-co-location relationship indicates a relationship corresponding to average delay and delay spread parameters; an indication of a channel state information reference signal resource group in a channel state information reporting configuration; an indication of the channel state information reference signal resource groups via a rule; or a combination thereof. In one embodiment, two channel state information reports are fed back per channel state information reporting setting.

In certain embodiments, a first channel state information report of the two channel state information reports comprises a channel state information reference signal resource indicator, a synchronization signal/physical broadcast channel block resource indicator, a rank indicator, a precoder matrix indicator, a layer indicator, a channel quality indicator, a layer one reference signal received power, a layer one signal-to-interference-and-noise ratio, or a combination thereof. In some embodiments, a second channel state information report of the two channel state information reports comprises a channel state information reference signal resource indicator, a synchronization signal/physical broadcast channel block resource indicator, a precoder matrix indicator, or a combination thereof.

In various embodiments, one channel state information report is fed back per channel state information report setting of the at least one channel state information report setting, the one channel state information report comprises two channel state information reference signal resource indicators, two synchronization signal/physical broadcast channel block resource indicators, a rank indicator, two precoder matrix indicators, a layer indicator, a channel quality indicator, a layer one reference signal received power, a layer one signal-to-interference-and-noise ratio, or a combination thereof, and the one channel state information report is decomposed into two channel state information parts comprising a channel state information part 1 and a channel state information part 2. In one embodiment, the one channel state information report comprises an indicator in channel state information part 1 that indicates whether one or two of a precoder matrix indicator, a channel state information reference signal resource indicator, a synchronization signal/physical broadcast channel block resource indicator, or a combination thereof, are fed back in the one channel state information report.

In certain embodiments, the indicator in the channel state information part 1 is a one-bit indicator that only indicates whether one or two of the precoder matrix indicator, the channel state information reference signal resource indicator, the synchronization signal/physical broadcast channel block resource indicator, or a combination thereof, are fed back in the one channel state information report. In some embodiments, the indicator in the channel state information part 1 is a multi-bit indicator that indicates whether one or two of the precoder matrix indicator, the channel state information reference signal resource indicator, the synchronization signal/physical broadcast channel block resource indicator, or a combination thereof, are fed back in the one channel state information report, and indicates one channel state information reference signal group of the two channel state information reference signal groups.

In various embodiments, the one channel state information report includes a dependent indicator in the channel state information part 2 in which a presence of the dependent indicator is dependent on a value of the one-bit indicator in the channel state information part 1, the one-bit indicator in the channel state information part 1 indicates whether one or two of the precoder matrix indicator, the channel state information reference signal resource indicator, the synchronization signal/physical broadcast channel block resource indicator, or a combination thereof, are fed back in the one channel state information report, and the dependent indicator in the channel state information part 2 indicates one channel state information reference signal group of the two channel state information reference signal groups. In one embodiment, the at least one channel state information report comprises an indication at least one Doppler shift value based on the channel state information measurement, and a Doppler shift value of the at least one Doppler shift value is indicated in a differential form with respect to a reference value.

In one embodiment, a method of a user equipment comprises: receiving at least one channel state information report setting, wherein each channel state information report setting of the at least one channel state information report setting triggers at least one channel state information resource setting; receiving at least one set of reference signals transmitted from at least one transmission and reception point in a network according to the at least one channel state information resource setting; receiving an indication of channel state information measurement, channel state information reporting, or a combination thereof corresponding to a single frequency network scheme for the at least one transmission and reception point in the network; and transmitting at least one channel state information report on at least one physical uplink shared channel, physical uplink control channel, or a combination thereof based on the at least one channel state information report setting; wherein each transmission and reception point of the at least one transmission and reception point comprises a transmission point, a reception point, a node, a panel, a communication associated with a control resource set pool, a communication associated with a transmission configuration indicator state from a transmission configuration comprising at least two transmission configuration indicator states, or a combination thereof.

In certain embodiments, the indication of the channel state information measurement, the channel state information reporting, or the combination thereof comprises: indicating the single frequency network scheme using a high layer parameter; indicating the single frequency network scheme using at least one downlink configuration indicator bit; indicating the single frequency network scheme based on a presence of two tracking reference signals; indicating the single frequency network scheme using a joint transmission configuration indicator state configuration; indicating the single frequency network scheme using a parameter in a channel state information report configuration; indicating the single frequency network scheme using two channel state information reference signal resources; indicating the single frequency network scheme using a report quantity in the channel state information report configuration; or some combination thereof.

In some embodiments, at least one channel state information reference signal is grouped into two channel state information reference signal groups corresponding to: different channel state information reference signal resource sets for different transmission and reception points; different channel state information reference signal resources of one channel state information reference signal resource set; different channel state information reference signal ports of the same channel state information reference signal resource; or a combination thereof.

In various embodiments, the two channel state information reference signal groups are based on: a quasi-co-location relationship between a tracking reference signal and a channel state information reference signal in at least one channel state information reference signal group, wherein a tracking reference signal indicates a non-zero-power channel state information reference signal resource configured by a high layer parameter indicating tracking reference signal information; a quasi-co-location relationship between a demodulation reference signal of a physical downlink shared channel, a demodulation reference signal of a physical downlink control channel, or a combination thereof, and a channel state information reference signal in at least one channel state information reference signal group, and wherein the quasi-co-location relationship indicates a relationship corresponding to average delay and delay spread parameters; an indication of a channel state information reference signal resource group in a channel state information reporting configuration; an indication of the channel state information reference signal resource groups via a rule; or a combination thereof.

In one embodiment, two channel state information reports are fed back per channel state information reporting setting.

In certain embodiments, a first channel state information report of the two channel state information reports comprises a channel state information reference signal resource indicator, a synchronization signal/physical broadcast channel block resource indicator, a rank indicator, a precoder matrix indicator, a layer indicator, a channel quality indicator, a layer one reference signal received power, a layer one signal-to-interference-and-noise ratio, or a combination thereof.

In some embodiments, a second channel state information report of the two channel state information reports comprises a channel state information reference signal resource indicator, a synchronization signal/physical broadcast channel block resource indicator, a precoder matrix indicator, or a combination thereof.

In various embodiments, one channel state information report is fed back per channel state information report setting of the at least one channel state information report setting, the one channel state information report comprises two channel state information reference signal resource indicators, two synchronization signal/physical broadcast channel block resource indicators, a rank indicator, two precoder matrix indicators, a layer indicator, a channel quality indicator, a layer one reference signal received power, a layer one signal-to-interference-and-noise ratio, or a combination thereof, and the one channel state information report is decomposed into two channel state information parts comprising a channel state information part 1 and a channel state information part 2.

In one embodiment, the one channel state information report comprises an indicator in channel state information part 1 that indicates whether one or two of a precoder matrix indicator, a channel state information reference signal resource indicator, a synchronization signal/physical broadcast channel block resource indicator, or a combination thereof, are fed back in the one channel state information report.

In certain embodiments, the indicator in the channel state information part 1 is a one-bit indicator that only indicates whether one or two of the precoder matrix indicator, the channel state information reference signal resource indicator, the synchronization signal/physical broadcast channel block resource indicator, or a combination thereof, are fed back in the one channel state information report.

In some embodiments, the indicator in the channel state information part 1 is a multi-bit indicator that indicates whether one or two of the precoder matrix indicator, the channel state information reference signal resource indicator, the synchronization signal/physical broadcast channel block resource indicator, or a combination thereof, are fed back in the one channel state information report, and indicates one channel state information reference signal group of the two channel state information reference signal groups.

In various embodiments, the one channel state information report includes a dependent indicator in the channel state information part 2 in which a presence of the dependent indicator is dependent on a value of the one-bit indicator in the channel state information part 1, the one-bit indicator in the channel state information part 1 indicates whether one or two of the precoder matrix indicator, the channel state information reference signal resource indicator, the synchronization signal/physical broadcast channel block resource indicator, or a combination thereof, are fed back in the one channel state information report, and the dependent indicator in the channel state information part 2 indicates one channel state information reference signal group of the two channel state information reference signal groups.

In one embodiment, the at least one channel state information report comprises an indication at least one Doppler shift value based on the channel state information measurement, and a Doppler shift value of the at least one Doppler shift value is indicated in a differential form with respect to a reference value.

In one embodiment, an apparatus comprises a user equipment. The apparatus further comprises: a receiver that: receives at least one channel state information report setting, wherein each channel state information report setting of the at least one channel state information report setting triggers at least one channel state information resource setting; receives at least one set of reference signals transmitted from at least one transmission and reception point in a network according to the at least one channel state information resource setting; and receives an indication of channel state information measurement, channel state information reporting, or a combination thereof corresponding to a single frequency network scheme for the at least one transmission and reception point in the network; and a transmitter that transmits at least one channel state information report on at least one physical uplink shared channel, physical uplink control channel, or a combination thereof based on the at least one channel state information report setting; wherein each transmission and reception point of the at least one transmission and reception point comprises a transmission point, a reception point, a node, a panel, a communication associated with a control resource set pool, a communication associated with a transmission configuration indicator state from a transmission configuration comprising at least two transmission configuration indicator states, or a combination thereof.

In certain embodiments, the indication of the channel state information measurement, the channel state information reporting, or the combination thereof comprises: indicating the single frequency network scheme using a high layer parameter; indicating the single frequency network scheme using at least one downlink configuration indicator bit; indicating the single frequency network scheme based on a presence of two tracking reference signals; indicating the single frequency network scheme using a joint transmission configuration indicator state configuration; indicating the single frequency network scheme using a parameter in a channel state information report configuration; indicating the single frequency network scheme using two channel state information reference signal resources; indicating the single frequency network scheme using a report quantity in the channel state information report configuration; or some combination thereof.

In some embodiments, at least one channel state information reference signal is grouped into two channel state information reference signal groups corresponding to: different channel state information reference signal resource sets for different transmission and reception points; different channel state information reference signal resources of one channel state information reference signal resource set; different channel state information reference signal ports of the same channel state information reference signal resource; or a combination thereof.

In various embodiments, the two channel state information reference signal groups are based on: a quasi-co-location relationship between a tracking reference signal and a channel state information reference signal in at least one channel state information reference signal group, wherein a tracking reference signal indicates a non-zero-power channel state information reference signal resource configured by a high layer parameter indicating tracking reference signal information; a quasi-co-location relationship between a demodulation reference signal of a physical downlink shared channel, a demodulation reference signal of a physical downlink control channel, or a combination thereof, and a channel state information reference signal in at least one channel state information reference signal group, and wherein the quasi-co-location relationship indicates a relationship corresponding to average delay and delay spread parameters; an indication of a channel state information reference signal resource group in a channel state information reporting configuration; an indication of the channel state information reference signal resource groups via a rule; or a combination thereof.

In one embodiment, two channel state information reports are fed back per channel state information reporting setting.

In certain embodiments, a first channel state information report of the two channel state information reports comprises a channel state information reference signal resource indicator, a synchronization signal/physical broadcast channel block resource indicator, a rank indicator, a precoder matrix indicator, a layer indicator, a channel quality indicator, a layer one reference signal received power, a layer one signal-to-interference-and-noise ratio, or a combination thereof.

In some embodiments, a second channel state information report of the two channel state information reports comprises a channel state information reference signal resource indicator, a synchronization signal/physical broadcast channel block resource indicator, a precoder matrix indicator, or a combination thereof.

In various embodiments, one channel state information report is fed back per channel state information report setting of the at least one channel state information report setting, the one channel state information report comprises two channel state information reference signal resource indicators, two synchronization signal/physical broadcast channel block resource indicators, a rank indicator, two precoder matrix indicators, a layer indicator, a channel quality indicator, a layer one reference signal received power, a layer one signal-to-interference-and-noise ratio, or a combination thereof, and the one channel state information report is decomposed into two channel state information parts comprising a channel state information part 1 and a channel state information part 2.

In one embodiment, the one channel state information report comprises an indicator in channel state information part 1 that indicates whether one or two of a precoder matrix indicator, a channel state information reference signal resource indicator, a synchronization signal/physical broadcast channel block resource indicator, or a combination thereof, are fed back in the one channel state information report.

In certain embodiments, the indicator in the channel state information part 1 is a one-bit indicator that only indicates whether one or two of the precoder matrix indicator, the channel state information reference signal resource indicator, the synchronization signal/physical broadcast channel block resource indicator, or a combination thereof, are fed back in the one channel state information report.

In some embodiments, the indicator in the channel state information part 1 is a multi-bit indicator that indicates whether one or two of the precoder matrix indicator, the channel state information reference signal resource indicator, the synchronization signal/physical broadcast channel block resource indicator, or a combination thereof, are fed back in the one channel state information report, and indicates one channel state information reference signal group of the two channel state information reference signal groups.

In various embodiments, the one channel state information report includes a dependent indicator in the channel state information part 2 in which a presence of the dependent indicator is dependent on a value of the one-bit indicator in the channel state information part 1, the one-bit indicator in the channel state information part 1 indicates whether one or two of the precoder matrix indicator, the channel state information reference signal resource indicator, the synchronization signal/physical broadcast channel block resource indicator, or a combination thereof, are fed back in the one channel state information report, and the dependent indicator in the channel state information part 2 indicates one channel state information reference signal group of the two channel state information reference signal groups.

In one embodiment, the at least one channel state information report comprises an indication at least one Doppler shift value based on the channel state information measurement, and a Doppler shift value of the at least one Doppler shift value is indicated in a differential form with respect to a reference value.

In one embodiment, a method of a network device comprises: transmitting at least one channel state information report setting, wherein each channel state information report setting of the at least one channel state information report setting triggers at least one channel state information resource setting; transmitting at least one set of reference signals transmitted from at least one transmission and reception point in a network according to the at least one channel state information resource setting; transmitting an indication of channel state information measurement, channel state information reporting, or a combination thereof corresponding to a single frequency network scheme for the at least one transmission and reception point in the network; and receiving at least one channel state information report on at least one physical uplink shared channel, physical uplink control channel, or a combination thereof based on the at least one channel state information report setting; wherein each transmission and reception point of the at least one transmission and reception point comprises a transmission point, a reception point, a node, a panel, a communication associated with a control resource set pool, a communication associated with a transmission configuration indicator state from a transmission configuration comprising at least two transmission configuration indicator states, or a combination thereof.

In certain embodiments, the indication of the channel state information measurement, the channel state information reporting, or the combination thereof comprises: indicating the single frequency network scheme using a high layer parameter; indicating the single frequency network scheme using at least one downlink configuration indicator bit; indicating the single frequency network scheme based on a presence of two tracking reference signals; indicating the single frequency network scheme using a joint transmission configuration indicator state configuration; indicating the single frequency network scheme using a parameter in a channel state information report configuration; indicating the single frequency network scheme using two channel state information reference signal resources; indicating the single frequency network scheme using a report quantity in the channel state information report configuration; or some combination thereof.

In some embodiments, at least one channel state information reference signal is grouped into two channel state information reference signal groups corresponding to: different channel state information reference signal resource sets for different transmission and reception points; different channel state information reference signal resources of one channel state information reference signal resource set; different channel state information reference signal ports of the same channel state information reference signal resource; or a combination thereof.

In various embodiments, the two channel state information reference signal groups are based on: a quasi-co-location relationship between a tracking reference signal and a channel state information reference signal in at least one channel state information reference signal group, wherein a tracking reference signal indicates a non-zero-power channel state information reference signal resource configured by a high layer parameter indicating tracking reference signal information; a quasi-co-location relationship between a demodulation reference signal of a physical downlink shared channel, a demodulation reference signal of a physical downlink control channel, or a combination thereof, and a channel state information reference signal in at least one channel state information reference signal group, and wherein the quasi-co-location relationship indicates a relationship corresponding to average delay and delay spread parameters; an indication of a channel state information reference signal resource group in a channel state information reporting configuration; an indication of the channel state information reference signal resource groups via a rule; or a combination thereof.

In one embodiment, two channel state information reports are fed back per channel state information reporting setting.

In certain embodiments, a first channel state information report of the two channel state information reports comprises a channel state information reference signal resource indicator, a synchronization signal/physical broadcast channel block resource indicator, a rank indicator, a precoder matrix indicator, a layer indicator, a channel quality indicator, a layer one reference signal received power, a layer one signal-to-interference-and-noise ratio, or a combination thereof.

In some embodiments, a second channel state information report of the two channel state information reports comprises a channel state information reference signal resource indicator, a synchronization signal/physical broadcast channel block resource indicator, a precoder matrix indicator, or a combination thereof.

In various embodiments, one channel state information report is fed back per channel state information report setting of the at least one channel state information report setting, the one channel state information report comprises two channel state information reference signal resource indicators, two synchronization signal/physical broadcast channel block resource indicators, a rank indicator, two precoder matrix indicators, a layer indicator, a channel quality indicator, a layer one reference signal received power, a layer one signal-to-interference-and-noise ratio, or a combination thereof, and the one channel state information report is decomposed into two channel state information parts comprising a channel state information part 1 and a channel state information part 2.

In one embodiment, the one channel state information report comprises an indicator in channel state information part 1 that indicates whether one or two of a precoder matrix indicator, a channel state information reference signal resource indicator, a synchronization signal/physical broadcast channel block resource indicator, or a combination thereof, are fed back in the one channel state information report.

In certain embodiments, the indicator in the channel state information part 1 is a one-bit indicator that only indicates whether one or two of the precoder matrix indicator, the channel state information reference signal resource indicator, the synchronization signal/physical broadcast channel block resource indicator, or a combination thereof, are fed back in the one channel state information report.

In some embodiments, the indicator in the channel state information part 1 is a multi-bit indicator that indicates whether one or two of the precoder matrix indicator, the channel state information reference signal resource indicator, the synchronization signal/physical broadcast channel block resource indicator, or a combination thereof, are fed back in the one channel state information report, and indicates one channel state information reference signal group of the two channel state information reference signal groups.

In various embodiments, the one channel state information report includes a dependent indicator in the channel state information part 2 in which a presence of the dependent indicator is dependent on a value of the one-bit indicator in the channel state information part 1, the one-bit indicator in the channel state information part 1 indicates whether one or two of the precoder matrix indicator, the channel state information reference signal resource indicator, the synchronization signal/physical broadcast channel block resource indicator, or a combination thereof, are fed back in the one channel state information report, and the dependent indicator in the channel state information part 2 indicates one channel state information reference signal group of the two channel state information reference signal groups.

In one embodiment, the at least one channel state information report comprises an indication at least one Doppler shift value based on the channel state information measurement, and a Doppler shift value of the at least one Doppler shift value is indicated in a differential form with respect to a reference value.

In one embodiment, an apparatus comprises a network device. The apparatus further comprises: a transmitter that: transmits at least one channel state information report setting, wherein each channel state information report setting of the at least one channel state information report setting triggers at least one channel state information resource setting; transmits at least one set of reference signals transmitted from at least one transmission and reception point in a network according to the at least one channel state information resource setting; and transmits an indication of channel state information measurement, channel state information reporting, or a combination thereof corresponding to a single frequency network scheme for the at least one transmission and reception point in the network; and a receiver that receives at least one channel state information report on at least one physical uplink shared channel, physical uplink control channel, or a combination thereof based on the at least one channel state information report setting; wherein each transmission and reception point of the at least one transmission and reception point comprises a transmission point, a reception point, a node, a panel, a communication associated with a control resource set pool, a communication associated with a transmission configuration indicator state from a transmission configuration comprising at least two transmission configuration indicator states, or a combination thereof.

In certain embodiments, the indication of the channel state information measurement, the channel state information reporting, or the combination thereof comprises: indicating the single frequency network scheme using a high layer parameter; indicating the single frequency network scheme using at least one downlink configuration indicator bit; indicating the single frequency network scheme based on a presence of two tracking reference signals; indicating the single frequency network scheme using a joint transmission configuration indicator state configuration; indicating the single frequency network scheme using a parameter in a channel state information report configuration; indicating the single frequency network scheme using two channel state information reference signal resources; indicating the single frequency network scheme using a report quantity in the channel state information report configuration; or some combination thereof.

In some embodiments, at least one channel state information reference signal is grouped into two channel state information reference signal groups corresponding to: different channel state information reference signal resource sets for different transmission and reception points; different channel state information reference signal resources of one channel state information reference signal resource set; different channel state information reference signal ports of the same channel state information reference signal resource; or a combination thereof.

In various embodiments, the two channel state information reference signal groups are based on: a quasi-co-location relationship between a tracking reference signal and a channel state information reference signal in at least one channel state information reference signal group, wherein a tracking reference signal indicates a non-zero-power channel state information reference signal resource configured by a high layer parameter indicating tracking reference signal information; a quasi-co-location relationship between a demodulation reference signal of a physical downlink shared channel, a demodulation reference signal of a physical downlink control channel, or a combination thereof, and a channel state information reference signal in at least one channel state information reference signal group, and wherein the quasi-co-location relationship indicates a relationship corresponding to average delay and delay spread parameters; an indication of a channel state information reference signal resource group in a channel state information reporting configuration; an indication of the channel state information reference signal resource groups via a rule; or a combination thereof.

In one embodiment, two channel state information reports are fed back per channel state information reporting setting.

In certain embodiments, a first channel state information report of the two channel state information reports comprises a channel state information reference signal resource indicator, a synchronization signal/physical broadcast channel block resource indicator, a rank indicator, a precoder matrix indicator, a layer indicator, a channel quality indicator, a layer one reference signal received power, a layer one signal-to-interference-and-noise ratio, or a combination thereof.

In some embodiments, a second channel state information report of the two channel state information reports comprises a channel state information reference signal resource indicator, a synchronization signal/physical broadcast channel block resource indicator, a precoder matrix indicator, or a combination thereof.

In various embodiments, one channel state information report is fed back per channel state information report setting of the at least one channel state information report setting, the one channel state information report comprises two channel state information reference signal resource indicators, two synchronization signal/physical broadcast channel block resource indicators, a rank indicator, two precoder matrix indicators, a layer indicator, a channel quality indicator, a layer one reference signal received power, a layer one signal-to-interference-and-noise ratio, or a combination thereof, and the one channel state information report is decomposed into two channel state information parts comprising a channel state information part 1 and a channel state information part 2.

In one embodiment, the one channel state information report comprises an indicator in channel state information part 1 that indicates whether one or two of a precoder matrix indicator, a channel state information reference signal resource indicator, a synchronization signal/physical broadcast channel block resource indicator, or a combination thereof, are fed back in the one channel state information report.

In certain embodiments, the indicator in the channel state information part 1 is a one-bit indicator that only indicates whether one or two of the precoder matrix indicator, the channel state information reference signal resource indicator, the synchronization signal/physical broadcast channel block resource indicator, or a combination thereof, are fed back in the one channel state information report.

In some embodiments, the indicator in the channel state information part 1 is a multi-bit indicator that indicates whether one or two of the precoder matrix indicator, the channel state information reference signal resource indicator, the synchronization signal/physical broadcast channel block resource indicator, or a combination thereof, are fed back in the one channel state information report, and indicates one channel state information reference signal group of the two channel state information reference signal groups.

In various embodiments, the one channel state information report includes a dependent indicator in the channel state information part 2 in which a presence of the dependent indicator is dependent on a value of the one-bit indicator in the channel state information part 1, the one-bit indicator in the channel state information part 1 indicates whether one or two of the precoder matrix indicator, the channel state information reference signal resource indicator, the synchronization signal/physical broadcast channel block resource indicator, or a combination thereof, are fed back in the one channel state information report, and the dependent indicator in the channel state information part 2 indicates one channel state information reference signal group of the two channel state information reference signal groups.

In one embodiment, the at least one channel state information report comprises an indication at least one Doppler shift value based on the channel state information measurement, and a Doppler shift value of the at least one Doppler shift value is indicated in a differential form with respect to a reference value.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

receiving at least one channel state information (CSI) report setting, wherein each CSI report setting of the at least one CSI report setting triggers at least one CSI resource setting;

receiving at least one set of reference signals (RSs) transmitted from at least one transmission and reception point (TRP) in a network according to the at least one CSI resource setting;

receiving an indication of CSI measurement, CSI reporting, or a combination thereof corresponding to a single frequency network (SFN) scheme for the at least one TRP in the network; and transmitting at least one CSI report on at least one physical uplink shared channel (PUSCH), physical uplink control channel (PUCCH), or a combination thereof based on the at least one CSI report setting;

wherein each TRP of the at least one TRP comprises a transmission point, a reception point, a node, a panel, a communication associated with a control resource set (CORESET) pool, a communication associated with a transmission configuration indicator (TCI) state from a transmission configuration comprising at least two TCI states, or a combination thereof;

wherein at least one CSI-RS is grouped into two CSI-RS groups corresponding to: different CSI-RS resource sets for different TRPs; different CSI-RS resources of one CSI-RS resource set; different CSI-RS ports of the same CSI-RS resource; or a combination thereof;

wherein one CSI report is fed back per CSI report setting of the at least one CSI report setting, the one CSI report comprises two CSI-RS resource indicators, two synchronization signal/physical broadcast channel (SS/PBCH) block resource indicators, a rank indicator (RI), two precoder matrix indicators (PMIs), a layer indicator (LI), a channel quality indicator (CQI), a layer one (L1) reference signal received power (RSRP), a L1 signal-to-interference-and-noise ratio (SINR), or a combination thereof, and the one CSI report is decomposed into two CSI parts comprising a CSI part 1 and a CSI part 2;

wherein the one CSI report comprises an indicator in CSI part 1 that indicates whether one or two of a PMI, a CRI, a SS/PBCH block resource indicator, or a combination thereof, are fed back in the one CSI report; and wherein the indicator in the CSI part 1 is a one-bit indicator that only indicates whether one or two of the PMI, the CSI-RS resource indicator, the SS/PBCH block resource indicator, or a combination thereof, are fed back in the one CSI report.

2. The method of claim 1, wherein the indication of the CSI measurement, the CSI reporting, or the combination thereof comprises:

indicating the SFN scheme using a high layer parameter;

indicating the SFN scheme using at least one downlink configuration indicator (DCI) bit;

indicating the SFN scheme based on a presence of two tracking reference (TRS) signals;

indicating the SFN scheme using a joint TCI state configuration;

indicating the SFN scheme using a parameter in a CSI report configuration;

indicating the SFN scheme using two CSI-RS resources;

indicating the SFN scheme using a report quantity in the CSI report configuration;

or a combination thereof.

3. The method of claim 1, wherein the two CSI-RS groups are based on:

a quasi-co-location (QCL) relationship between a tracking reference signal (TRS) and a CSI-RS in at least one CSI-RS group, wherein a TRS indicates a non-zero-power (NZP) CSI-RS resource configured by a high layer parameter indicating TRS information;

a QCL relationship between a demodulation reference signal (DMRS) of a physical downlink shared channel (PDSCH), a DMRS of a physical downlink control channel (PDCCH), or a combination thereof, and a CSI-RS in at least one CSI-RS group, and wherein the QCL relationship indicates a relationship corresponding to average delay and delay spread parameters;

an indication of a CSI-RS resource group in a CSI reporting configuration;

an indication of the CSI-RS resource groups via a rule;

or a combination thereof.

4. The method of claim 1, wherein two CSI reports are fed back per CSI reporting setting.

5. The method of claim 4, wherein a first CSI report of the two CSI reports comprises a CSI-RS resource indicator (CRI), a synchronization signal/physical broadcast channel (SS/PBCH) block resource indicator, a rank indicator (RI), a precoder matrix indicator (PMI), a layer indicator (LI), a channel quality indicator (CQI), a layer one (L1) reference signal received power (RSRP), a L1 signal-to-interference-and-noise ratio (SINR), or a combination thereof.

6. The method of claim 4, wherein a second CSI report of the two CSI reports comprises a CRI, a SS/PBCH block resource indicator, a PMI, or a combination thereof.

7. The method of claim 1, wherein the indicator in the CSI part 1 is a multi-bit indicator that indicates whether one or two of the PMI, the CSI-RS resource indicator, the SS/PBCH block resource indicator, or a combination thereof, are fed back in the one CSI report, and indicates one CSI-RS group of the two CSI-RS groups.

8. The method of claim 1, wherein the one CSI report includes a dependent indicator in the CSI part 2 in which a presence of the dependent indicator is dependent on a value of the one-bit indicator in the CSI part 1, the one-bit indicator in the CSI part 1 indicates whether one or two of the PMI, the CRI, the SS/PBCH block resource indicator, or a combination thereof, are fed back in the one CSI report, and the dependent indicator in the CSI part 2 indicates one CSI-RS group of the two CSI-RS groups.

9. The method of claim 1, wherein the at least one CSI report comprises an indication at least one Doppler shift value based on the CSI measurement.

10. A base station, comprising:

at least one memory; and at least one processor coupled with the at least one memory and configured to cause the base station to:

transmit at least one channel state information (CSI) report setting, wherein each CSI report setting of the at least one CSI report setting triggers at least one CSI resource setting;

transmit at least one set of reference signals (RSs) transmitted from at least one transmission and reception point (TRP) in a network according to the at least one CSI resource setting;

transmit an indication of CSI measurement, CSI reporting, or a combination thereof corresponding to a single frequency network (SFN) scheme for the at least one TRP in the network; and receive at least one CSI report on at least one physical uplink shared channel (PUSCH), physical uplink control channel (PUCCH), or a combination thereof based on the at least one CSI report setting;

wherein each TRP of the at least one TRP comprises a transmission point, a reception point, a node, a panel, a communication associated with a control resource set (CORESET) pool, a communication associated with a transmission configuration indicator (TCI) state from a transmission configuration comprising at least two TCI states, or a combination thereof;

wherein at least one CSI-RS is grouped into two CSI-RS groups corresponding to: different CSI-RS resource sets for different TRPs; different CSI-RS resources of one CSI-RS resource set; different CSI-RS ports of the same CSI-RS resource; or a combination thereof;

wherein one CSI report is fed back per CSI report setting of the at least one CSI report setting, the one CSI report comprises two CSI-RS resource indicators, two synchronization signal/physical broadcast channel (SS/PBCH) block resource indicators, a rank indicator (RI), two precoder matrix indicators (PMIs), a layer indicator (LI), a channel quality indicator (CQI), a layer one (L1) reference signal received power (RSRP), a L1 signal-to-interference-and-noise ratio (SINR), or a combination thereof, and the one CSI report is decomposed into two CSI parts comprising a CSI part 1 and a CSI part 2;

wherein the one CSI report comprises an indicator in CSI part 1 that indicates whether one or two of a PMI, a CRI, a SS/PBCH block resource indicator, or a combination thereof, are fed back in the one CSI report; and wherein the indicator in the CSI part 1 is a one-bit indicator that only indicates whether one or two of the PMI, the CSI-RS resource indicator, the SS/PBCH block resource indicator, or a combination thereof, are fed back in the one CSI report.

11. A method performed by a base station, the method comprising:

transmitting at least one channel state information (CSI) report setting, wherein each CSI report setting of the at least one CSI report setting triggers at least one CSI resource setting;

transmitting at least one set of reference signals (RSs) transmitted from at least one transmission and reception point (TRP) in a network according to the at least one CSI resource setting;

transmitting an indication of CSI measurement, CSI reporting, or a combination thereof corresponding to a single frequency network (SFN) scheme for the at least one TRP in the network; and receiving at least one CSI report on at least one physical uplink shared channel (PUSCH), physical uplink control channel (PUCCH), or a combination thereof based on the at least one CSI report setting;

wherein each TRP of the at least one TRP comprises a transmission point, a reception point, a node, a panel, a communication associated with a control resource set (CORESET) pool, a communication associated with a transmission configuration indicator (TCI) state from a transmission configuration comprising at least two TCI states, or a combination thereof;

wherein at least one CSI-RS is grouped into two CSI-RS groups corresponding to: different CSI-RS resource sets for different TRPs; different CSI-RS resources of one CSI-RS resource set; different CSI-RS ports of the same CSI-RS resource; or a combination thereof;

wherein one CSI report is fed back per CSI report setting of the at least one CSI report setting, the one CSI report comprises two CSI-RS resource indicators, two synchronization signal/physical broadcast channel (SS/PBCH) block resource indicators, a rank indicator (RI), two precoder matrix indicators (PMIs), a layer indicator (LI), a channel quality indicator (CQI), a layer one (L1) reference signal received power (RSRP), a L1 signal-to-interference-and-noise ratio (SINR), or a combination thereof, and the one CSI report is decomposed into two CSI parts comprising a CSI part 1 and a CSI part 2;

wherein the one CSI report comprises an indicator in CSI part 1 that indicates whether one or two of a PMI, a CRI, a SS/PBCH block resource indicator, or a combination thereof, are fed back in the one CSI report; and wherein the indicator in the CSI part 1 is a one-bit indicator that only indicates whether one or two of the PMI, the CSI-RS resource indicator, the SS/PBCH block resource indicator, or a combination thereof, are fed back in the one CSI report.

12. The base station of claim 10, wherein the indication of the CSI measurement, the CSI reporting, or the combination thereof comprises:

indicating the SFN scheme using a high layer parameter;

indicating the SFN scheme using at least one downlink configuration indicator (DCI) bit;

indicating the SFN scheme based on a presence of two tracking reference (TRS) signals;

indicating the SFN scheme using a joint TCI state configuration;

indicating the SFN scheme using a parameter in a CSI report configuration;

indicating the SFN scheme using two CSI-RS resources;

indicating the SFN scheme using a report quantity in the CSI report configuration;

or a combination thereof.

13. The base station of claim 10, wherein the two CSI-RS groups are based on:

a quasi-co-location (QCL) relationship between a tracking reference signal (TRS) and a CSI-RS in at least one CSI-RS group, wherein a TRS indicates a non-zero-power (NZP) CSI-RS resource configured by a high layer parameter indicating TRS information;

a QCL relationship between a demodulation reference signal (DMRS) of a physical downlink shared channel (PDSCH), a DMRS of a physical downlink control channel (PDCCH), or a combination thereof, and a CSI-RS in at least one CSI-RS group, and wherein the QCL relationship indicates a relationship corresponding to average delay and delay spread parameters;

an indication of a CSI-RS resource group in a CSI reporting configuration;

an indication of the CSI-RS resource groups via a rule;

or a combination thereof.

14. The base station of claim 10, wherein two CSI reports are fed back per CSI reporting setting.

15. The base station of claim 14, wherein a first CSI report of the two CSI reports comprises a CSI-RS resource indicator (CRI), a synchronization signal/physical broadcast channel (SS/PBCH) block resource indicator, a rank indicator (RI), a precoder matrix indicator (PMI), a layer indicator (LI), a channel quality indicator (CQI), a layer one (L1) reference signal received power (RSRP), a L1 signal-to-interference-and-noise ratio (SINR), or a combination thereof.

16. A user equipment (UE), comprising:

at least one memory; and at least one processor coupled with the at least one memory and configured to cause the UE to:

receive at least one channel state information (CSI) report setting, wherein each CSI report setting of the at least one CSI report setting triggers at least one CSI resource setting;

receive at least one set of reference signals (RSs) transmitted from at least one transmission and reception point (TRP) in a network according to the at least one CSI resource setting;

receive an indication of CSI measurement, CSI reporting, or a combination thereof corresponding to a single frequency network (SFN) scheme for the at least one TRP in the network; and transmit at least one CSI report on at least one physical uplink shared channel (PUSCH), physical uplink control channel (PUCCH), or a combination thereof based on the at least one CSI report setting;

wherein each TRP of the at least one TRP comprises a transmission point, a reception point, a node, a panel, a communication associated with a control resource set (CORESET) pool, a communication associated with a transmission configuration indicator (TCI) state from a transmission configuration comprising at least two TCI states, or a combination thereof;

wherein at least one CSI-RS is grouped into two CSI-RS groups corresponding to: different CSI-RS resource sets for different TRPs; different CSI-RS resources of one CSI-RS resource set; different CSI-RS ports of the same CSI-RS resource; or a combination thereof;

wherein one CSI report is fed back per CSI report setting of the at least one CSI report setting, the one CSI report comprises two CSI-RS resource indicators, two synchronization signal/physical broadcast channel (SS/PBCH) block resource indicators, a rank indicator (RI), two precoder matrix indicators (PMIs), a layer indicator (LI), a channel quality indicator (CQI), a layer one (L1) reference signal received power (RSRP), a L1 signal-to-interference-and-noise ratio (SINR), or a combination thereof, and the one CSI report is decomposed into two CSI parts comprising a CSI part 1 and a CSI part 2;

wherein the one CSI report comprises an indicator in CSI part 1 that indicates whether one or two of a PMI, a CRI, a SS/PBCH block resource indicator, or a combination thereof, are fed back in the one CSI report; and wherein the indicator in the CSI part 1 is a one-bit indicator that only indicates whether one or two of the PMI, the CSI-RS resource indicator, the SS/PBCH block resource indicator, or a combination thereof, are fed back in the one CSI report.

17. The UE of claim 16, wherein the indication of the CSI measurement, the CSI reporting, or the combination thereof comprises:

indicating the SFN scheme using a high layer parameter;

indicating the SFN scheme using at least one downlink configuration indicator (DCI) bit;

indicating the SFN scheme based on a presence of two tracking reference (TRS) signals;

indicating the SFN scheme using a joint TCI state configuration;

indicating the SFN scheme using a parameter in a CSI report configuration;

indicating the SFN scheme using two CSI-RS resources;

indicating the SFN scheme using a report quantity in the CSI report configuration;

or a combination thereof.

18. The UE of claim 16, wherein the two CSI-RS groups are based on:

a quasi-co-location (QCL) relationship between a tracking reference signal (TRS) and a CSI-RS in at least one CSI-RS group, wherein a TRS indicates a non-zero-power (NZP) CSI-RS resource configured by a high layer parameter indicating TRS information;

a QCL relationship between a demodulation reference signal (DMRS) of a physical downlink shared channel (PDSCH), a DMRS of a physical downlink control channel (PDCCH), or a combination thereof, and a CSI-RS in at least one CSI-RS group, and wherein the QCL relationship indicates a relationship corresponding to average delay and delay spread parameters;

an indication of a CSI-RS resource group in a CSI reporting configuration;

an indication of the CSI-RS resource groups via a rule;

or a combination thereof.

19. The UE of claim 16, wherein two CSI reports are fed back per CSI reporting setting.

20. The UE of claim 19, wherein a first CSI report of the two CSI reports comprises a CSI-RS resource indicator (CRI), a synchronization signal/physical broadcast channel (SS/PBCH) block resource indicator, a rank indicator (RI), a precoder matrix indicator (PMI), a layer indicator (LI), a channel quality indicator (CQI), a layer one (L1) reference signal received power (RSRP), a L1 signal-to-interference-and-noise ratio (SINR), or a combination thereof.

* * * * *